(12) United States Patent
Kaczynski et al.

(10) Patent No.: US 11,875,238 B2
(45) Date of Patent: Jan. 16, 2024

(54) FEATURE STORAGE MANAGER

(71) Applicant: SAS Institute Inc., Cary, NC (US)

(72) Inventors: Piotr Kaczynski, Warsaw (PL); Aneta Maksymiuk, Warsaw (PL); Artur Lukasz Skalski, Warsaw (PL); Wioletta Paulina Stobieniecka, Warsaw (PL); Dwijendra Nath Dwivedi, Dubai (AE)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 17/847,361

(22) Filed: Jun. 23, 2022

(65) Prior Publication Data

US 2022/0414541 A1    Dec. 29, 2022

Related U.S. Application Data

(60) Provisional application No. 63/215,381, filed on Jun. 25, 2021.

(51) Int. Cl.
*G06N 20/00*    (2019.01)
(52) U.S. Cl.
CPC .................................. *G06N 20/00* (2019.01)
(58) Field of Classification Search
None
See application file for complete search history.

(56) References Cited

U.S. PATENT DOCUMENTS

| | | | |
|---|---|---|---|
| 8,473,469 B1* | 6/2013 | Yancey | G06F 16/2365 707/703 |
| 10,600,005 B2 | 3/2020 | Gunes et al. | |
| 10,832,174 B1 | 11/2020 | Chen et al. | |
| 11,106,694 B1 | 8/2021 | Cox et al. | |
| 2017/0220814 A1* | 8/2017 | Pathak | G06F 21/105 |
| 2021/0117299 A1* | 4/2021 | Yara | G06F 11/0772 |

OTHER PUBLICATIONS

Wickham H, Grolemund G. R for data science: import, tidy, transform, visualize, and model data. O'Reilly Media, Inc.; Dec. 12, 2016. (Year: 2016).*

(Continued)

*Primary Examiner* — Vincent Gonzales
(74) *Attorney, Agent, or Firm* — COATS & BENNETT, PLLC

(57) ABSTRACT

A computing system obtains a first preconfigured feature set. The first preconfigured feature set defines: a first feature definition defining an input variable, and first computer instructions for locating first data. The first data is available for retrieval because it is stored, or set-up to arrive, in the feature storage according to the first preconfigured feature set. The computing system receives a requested data set for the input variable. The computing system generates an availability status indicating whether the request data set is available for retrieval according to the first preconfigured feature set. Based on the availability status, generating, by the computing system, the requested data set by: retrieving historical data for the first preconfigured feature set; retrieving a data definition associated with the historical data; and generating the requested data based on the historical data and the data definition.

30 Claims, 32 Drawing Sheets

(56) References Cited

OTHER PUBLICATIONS

Hyndman RJ, Athanasopoulos G. Forecasting: principles and practice. OTexts; May 8, 2018. 504 pages. (Year: 2018).*

Tran PH, Tran KP, Huong TT, Heuchenne C, HienTran P, Le TM. Real time data-driven approaches for credit card fraud detection. In Proceedings of the 2018 international conference on e-business and applications. Feb. 23, 2018, pp. 6-9. (Year: 2018).*

H2O.AI, "H2O AI Feature Store", Jan. 1, 2022, pp. 1-6, retrieved on Jul. 8, 2022, retrieved from internet: https://www.h2o.ai/platform/feature-store/.

H2I.AI, "H2O Driverless AI", Jan. 1, 2022, pp. 1-14, retrieved on Jul. 8, 2022, retrieved from internet: https://h2o.ai/platform/ai-cloud/make/h2o-driverless-ai/.

Dataiku, "Data Preparation with Dataiku", Jan. 1, 2022, pp. 1-8, retrieved on Jul. 8, 2022, retrieved from internet: https://www.dataiku.com/product/key-capabilities/data-preparation/.

Dataiku, "Discover Dataiku", Jan. 1, 2022, pp. 1-8, retrieved on Jul. 8, 2022, retrieved from internet: https://www.dataiku.com/product/.

Feast, "Serviing features in milliseconds with Feast feature store", Feb. 1. 2022, pp. 1-7, retrieved on Jul. 8, 2022, retrieved from internet: https://feast.dev/blog/feast-benchmarks/.

Feast, "Feasture Store for Machine Learning", Jan. 1, 2022, pp. 1-3, retrieved on Jul. 8, 2022, retrieved from internet: https://feast.dev/.

Hopswork, "Enterprise Feature Store", Jan. 1, 2022, pp. 1-3, retrieved on Jul. 8, 2022, retrieved from internet: https://www.hopsworks.ai/feature-store?__hstc=57991605e781dae09bf2f125ed4b1bc098297d4e.1644348295760.1644348295760.1644348295760.1&__hssc=57991605.1.1644348295760&__hsfp=1515802450&_ga=2.206364115.1590208454.1644348294-1756880094.1644348294.

Hopsworks, "Hopsworks Homepage", Jul. 1, 2022, pp. 1-5, retrieved on Jul. 8, 2022, retrieved from internet: https://www.hopsworks.ai/.

DataRobot, "DataRobot Automated Feature Discovery", Jan. 1, 2022, pp. 1-7, retrieved on 202-07-08, retrieved from Internet: https://www.datarobot.com/blog/next-generation-automated-feature-engineering/.

* cited by examiner

Run Feature Set Calculations

Type
CALCULATION

Period From
01.02.2022 00:00

Period To
28.02.2022 23:59

Properties

| Name | Type | Value |
|------|------|-------|
| custom property of | INTEGER | example value |

Add Property

Close    Save changes

1932 — Type
1934 — Period From / Period To
1936 — Properties
1930

*FIG. 19C*

Feature Set Details

| | |
|---|---|
| Feature set | test |
| Entity | mmmm |
| Version | 1.0 |
| Project | test |
| Description | 22 |

| | |
|---|---|
| Period Name | test |
| Period Type | HOUR |
| Period Value | 5 |
| Status | EDITABLE [Publish] [Archive] — 1942 |
| Type | VIYA |
| | UNKNOWN |
| | SAS9 |
| | VIYA |
| | ESP |

| Name | Description | Data Type |
|---|---|---|
| EVTD_DEACT1 | Description 1 | character |
| cint_id | Description 2 | integer |
| EVTD_INSTRD | Description 3 | decimal |
| EVTD_DEACT2 | Description 4 | decimal |

FIG. 20D

| Select | Feature Set | Feature Name | Description | Entity |
|---|---|---|---|---|
| ✓ | CH_CUST_D | cint_id | Description 2 | Customer |
| ✓ | CH_CUST_D | TR_AMT_VO | Description 6 | Customer |
| ✓ | CH_CUST_D | TR_MNT | Description 7 | Customer |
| ✓ | CH_CUST_D | TR_DYPRT | Description 8 | Customer |
| ✓ | CH_CUST_D | TR_WDY | Description 9 | Customer |
| ✓ | CH_CUST_D | TR_ABR_FLG | Description 10 | Customer |
| ✓ | CH_CUST_D | TR_CURR_CD | Description 11 | Customer |
| ✓ | CH_CUST_D | TR_MCC_CO | Description 12 | Customer |

Showing 1 to 8 of 56 entries

Generate analytical feature stage

[Generate]

FEATURE STORAGE MANAGER

CROSS-REFERENCE TO RELATED APPLICATIONS

This application claims the benefit of, and priority based on, 35 U.S.C. § 119 to U.S. Provisional Application No. 63/215,381, filed Jun. 25, 2021, the disclosures of each of which are incorporated herein by reference in their entirety.

BACKGROUND

Feature engineering is used to select, manipulate, and transform data into features that can be used for developing analytical models (e.g., training, updating, and validating machine learning models or regression models). To use features for developing the analytical models, the features typically are identified, data for the features is extracted and measured, and the features and their associated data are validated.

SUMMARY

In an example embodiment, a computer-program product tangibly embodied in a non-transitory machine-readable storage medium is provided. The computer-program product includes instructions to cause a computing system to obtain, at the computing system, a first preconfigured feature set comprising one or more feature definitions. The first preconfigured feature set defines: a first feature definition defining an input variable extracted by feature engineering for developing an analytical model; and first computer instructions for locating first data. The first data is associated with the input variable for developing the analytical model. The first data is available for retrieval because it is stored, or set-up to arrive, in the feature storage according to the first preconfigured feature set. The computer-program product includes instructions to cause a computing system to receive, at the computing system, a requested data set for the input variable for developing the analytical model. The computer-program product includes instructions to cause a computing system to generate, by the computing system, an availability status indicating whether the request data set is available for retrieval according to the first preconfigured feature set. The computer-program product includes instructions to cause a computing system to, based on the availability status, generate, by the computing system, the requested data set by: retrieving historical data for the first preconfigured feature set; retrieving a data definition associated with the historical data; and generating the requested data based on the historical data and the data definition. The computer-program product includes instructions to cause a computing system to control, by the computing system, development of the analytical model based on the requested data set.

In another example embodiment, a computing system is provided. The computing system includes, but is not limited to, a processor and memory. The memory contains instructions that when executed by the processor control the computing system to generate the requested data set and control development of an analytical model based on the requested data set.

In another example embodiment, a method is provided of generating the requested data set and controlling development of an analytical model based on the requested data set.

Other features and aspects of example embodiments are presented below in the Detailed Description when read in connection with the drawings presented with this application.

BRIEF DESCRIPTION OF THE DRAWINGS

FIGS. 19A-19D illustrate example graphical user interfaces for generating data associated with an entity according to at least one embodiment of the present technology.

FIGS. 20A-20E illustrate example graphical user interfaces for generating an analytical data set for a feature set according to at least one embodiment of the present technology.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
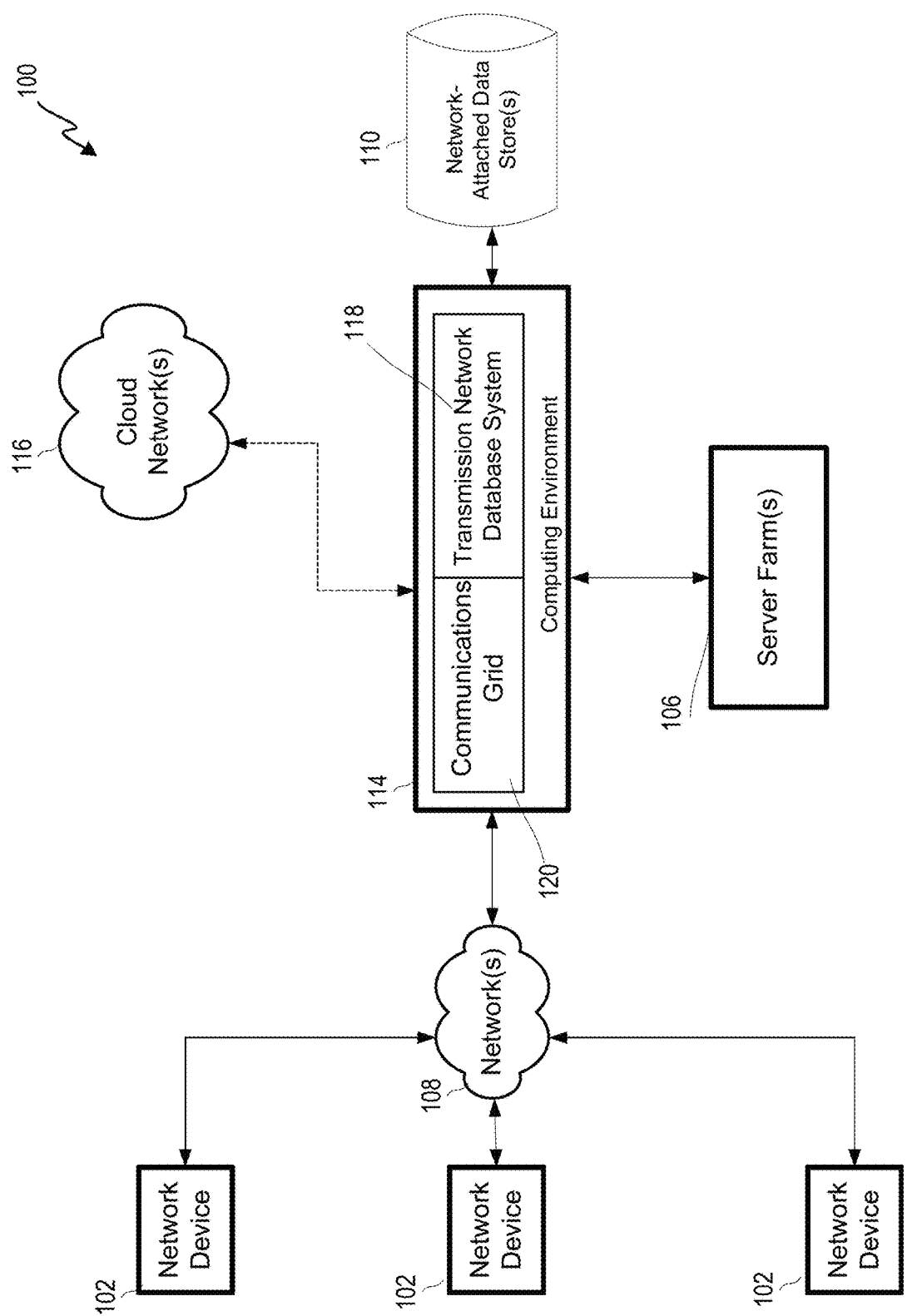
FIG. 1 illustrates a block diagram that provides an illustration of the hardware components of a computing system, according to at least one embodiment of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
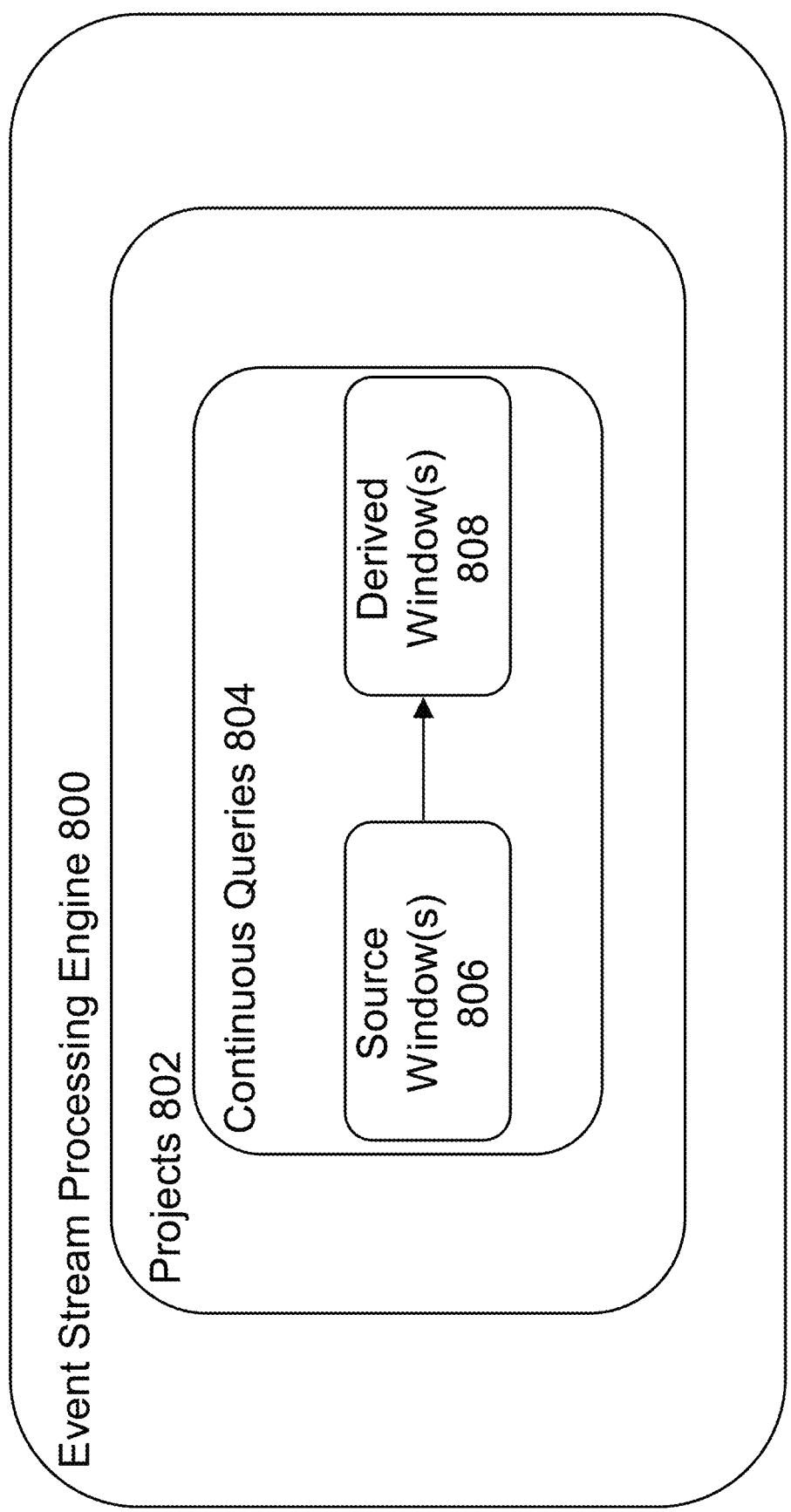
FIG. 8 illustrates a block diagram including components of an Event Stream Processing Engine (ESPE), according to at least one embodiment of the present technology.
Figure 9:
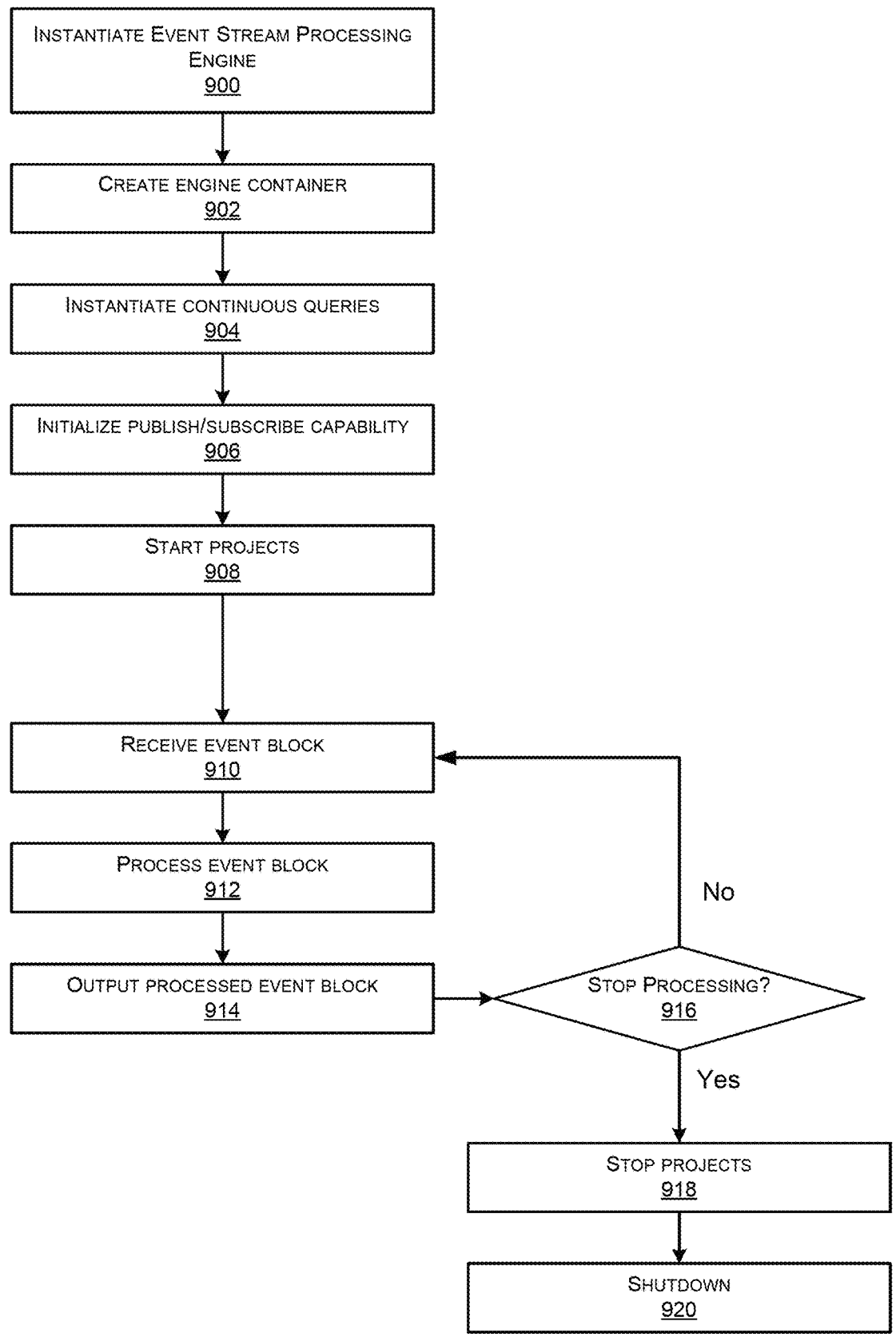
FIG. 9 illustrates a flow chart showing an example process including operations performed by an event stream processing engine, according to at least one embodiment of the present technology.
Figure 10:
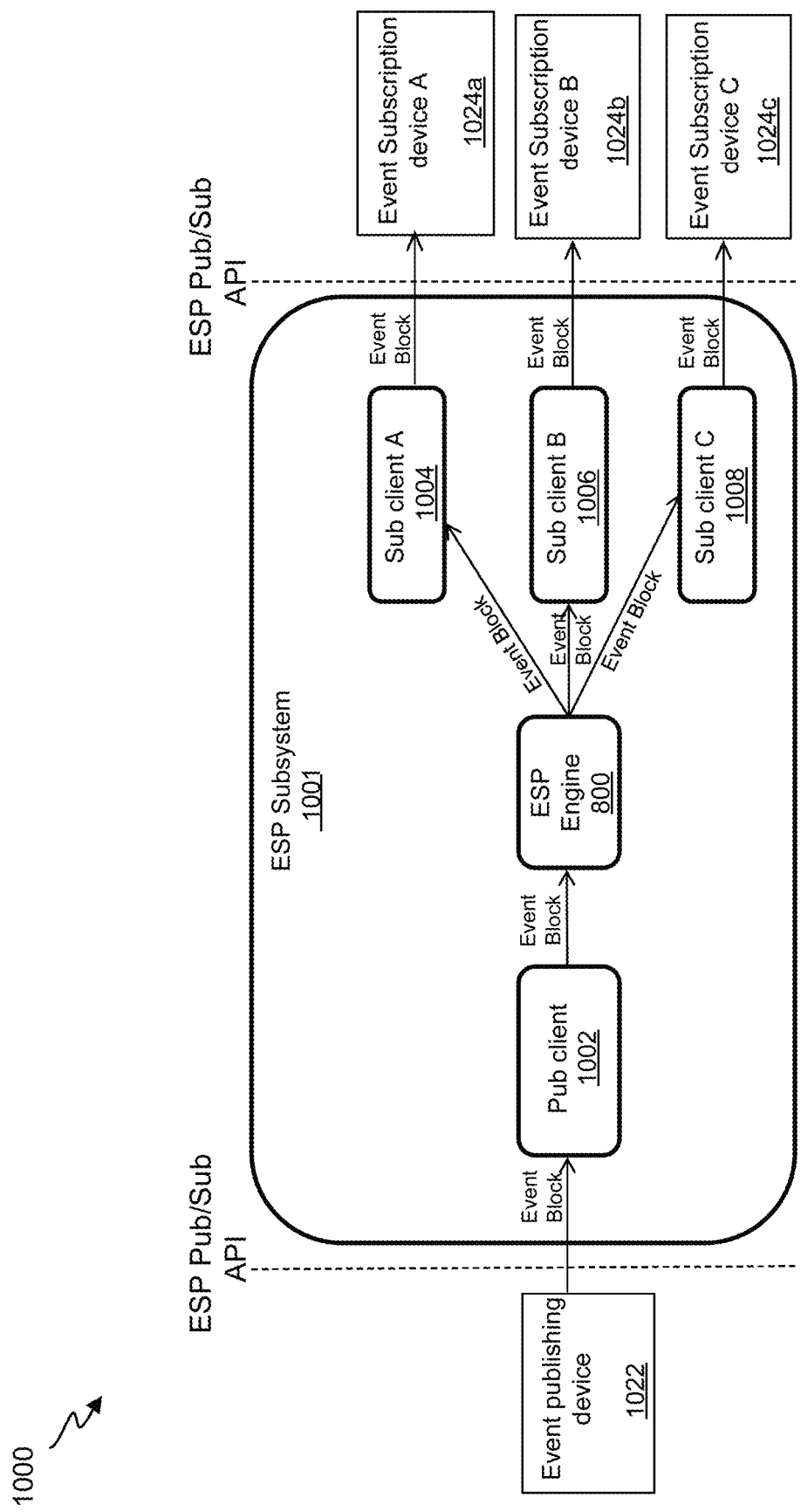
FIG. 10 illustrates an ESP system interfacing between a publishing device and multiple event subscribing devices, according to at least one embodiment of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or a remote server may include a server stack. As another example, data may be processed as part of computing environment 114.

Each communication within data transmission network 100 (e.g., between client devices, between a device and connection management system 150, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may include automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
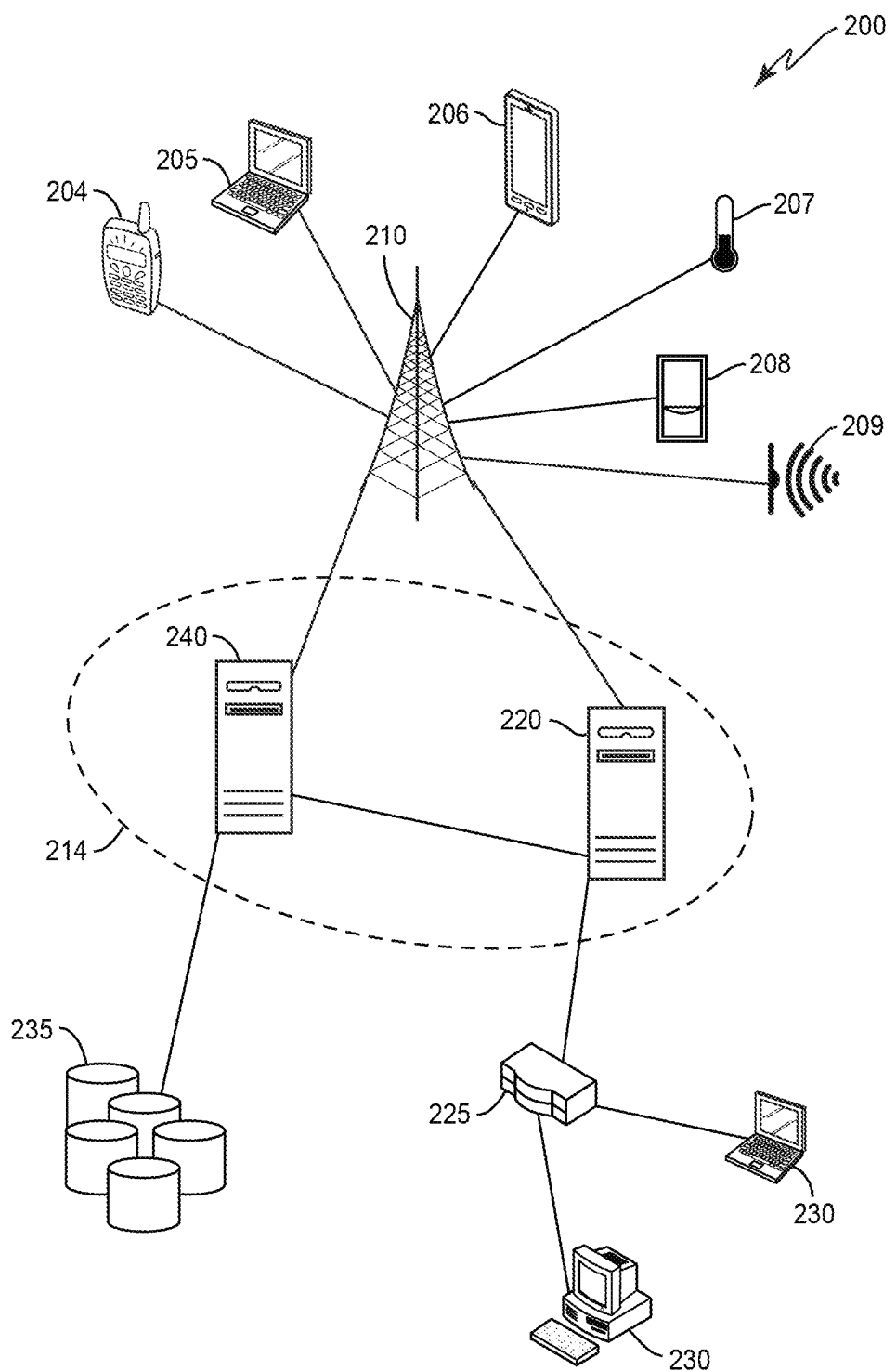
FIG. 2 illustrates an example network including an example set of devices communicating with each other over an exchange system and via a network, according to at least one embodiment of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
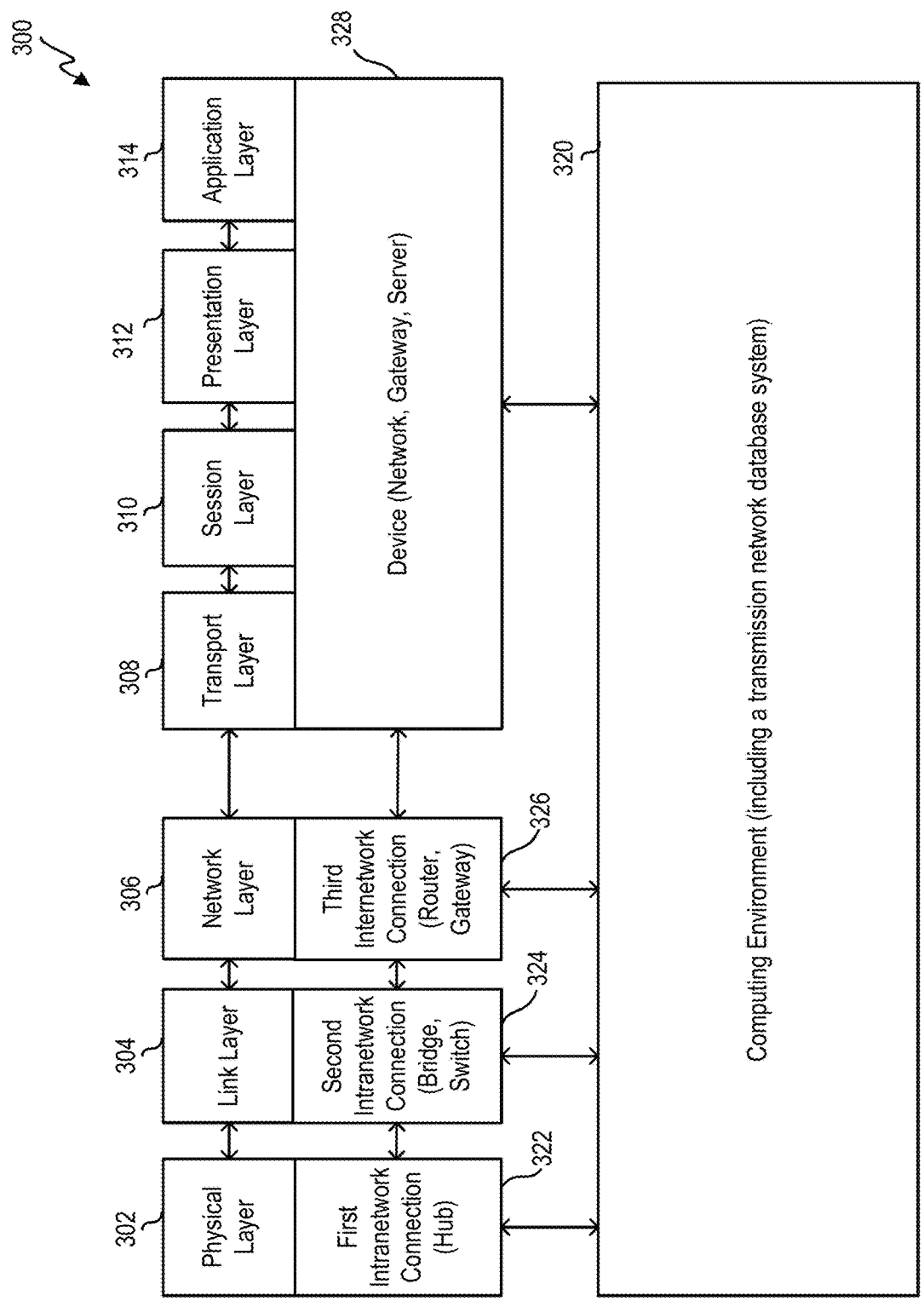
FIG. 3 illustrates a representation of a conceptual model of a communications protocol system, according to at least one embodiment of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 320 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bytes of data and is the farthest layer from the user in a communications system. On the other hand, the application layer is the highest layer because it interacts directly with a software application.

As noted, the model includes a physical layer 302. Physical layer 302 represents physical communication and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer and a switch can operate in the link layer. Inter-network connection components 326 and 328 are shown to operate on higher levels, such as layers 306-314. For example, routers can operate in the network layer and network devices can operate in the transport, session, presentation, and application layers.

As noted, a computing environment 320 can interact with and/or operate on, in various embodiments, one, more, all or any of the various layers. For example, computing environment 320 can interact with a hub (e.g., via the link layer) so as to adjust which devices the hub communicates with. The physical layer may be served by the link layer, so it may implement such data from the link layer. For example, the computing environment 320 may control which devices it will receive data from. For example, if the computing environment 320 knows that a certain network device has turned off, broken, or otherwise become unavailable or unreliable, the computing environment 320 may instruct the hub to prevent any data from being transmitted to the computing environment 320 from that network device. Such a process may be beneficial to avoid receiving data that is inaccurate or that has been influenced by an uncontrolled environment. As another example, computing environment 320 can communicate with a bridge, switch, router or gateway and influence which device within the system (e.g., system 200) the component selects as a destination. In some embodiments, computing environment 320 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 320 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
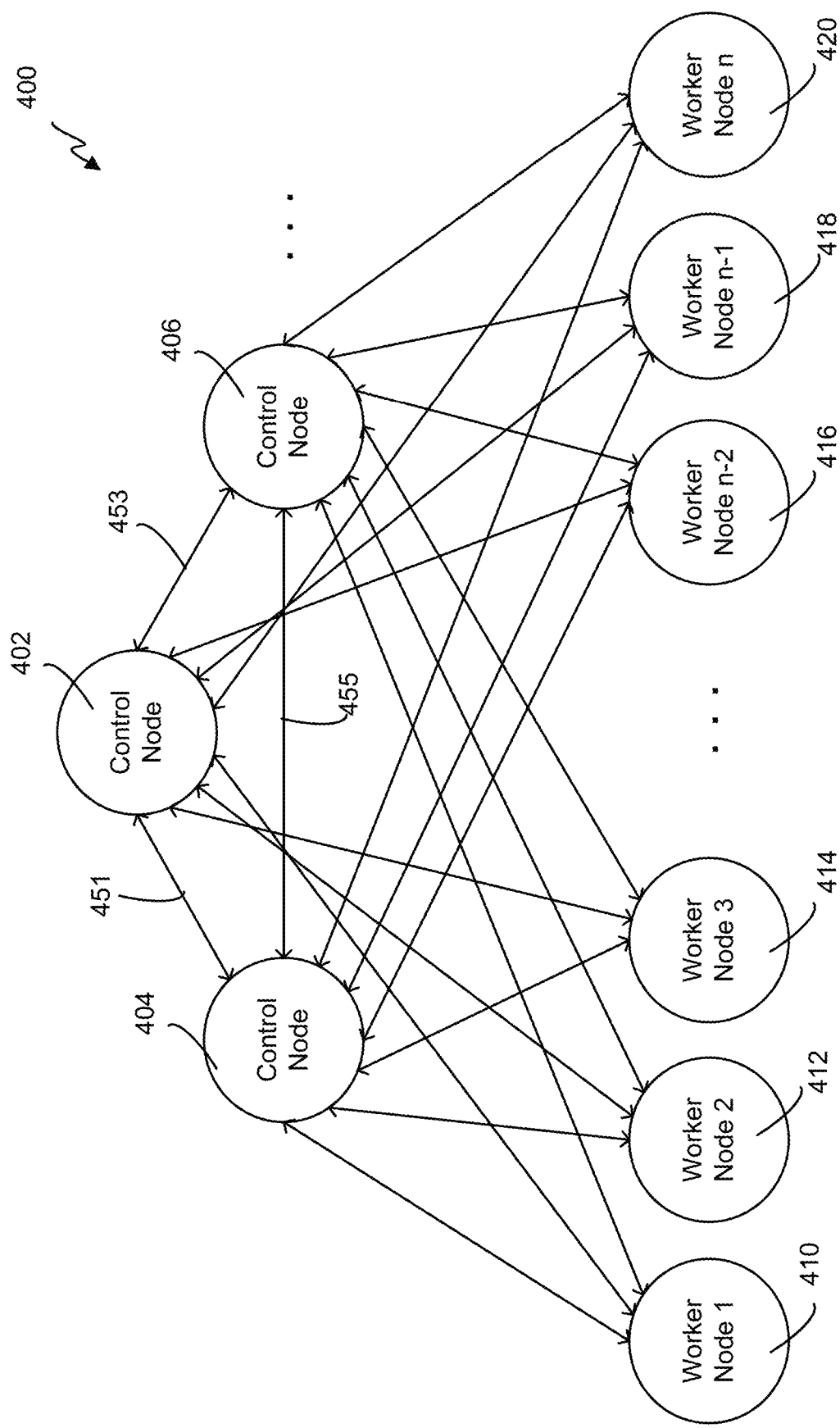
FIG. 4 illustrates a communications grid computing system including a variety of control and worker nodes, according to at least one embodiment of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
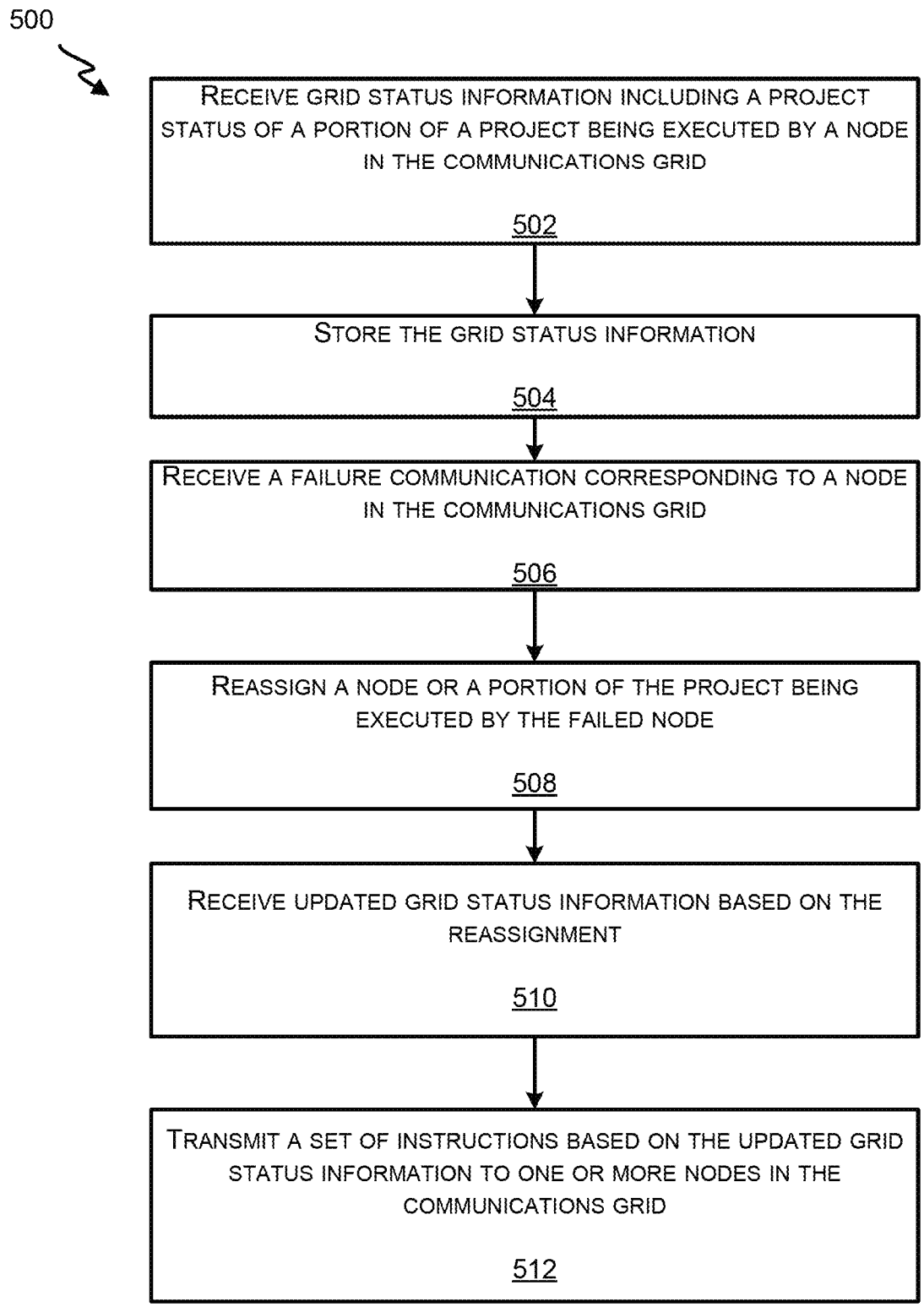
FIG. 5 illustrates a flow chart showing an example process for adjusting a communications grid or a work project in a communications grid after a failure of a node, according to at least one embodiment of the present technology.

FIG. 5 illustrates a flow chart 500 showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
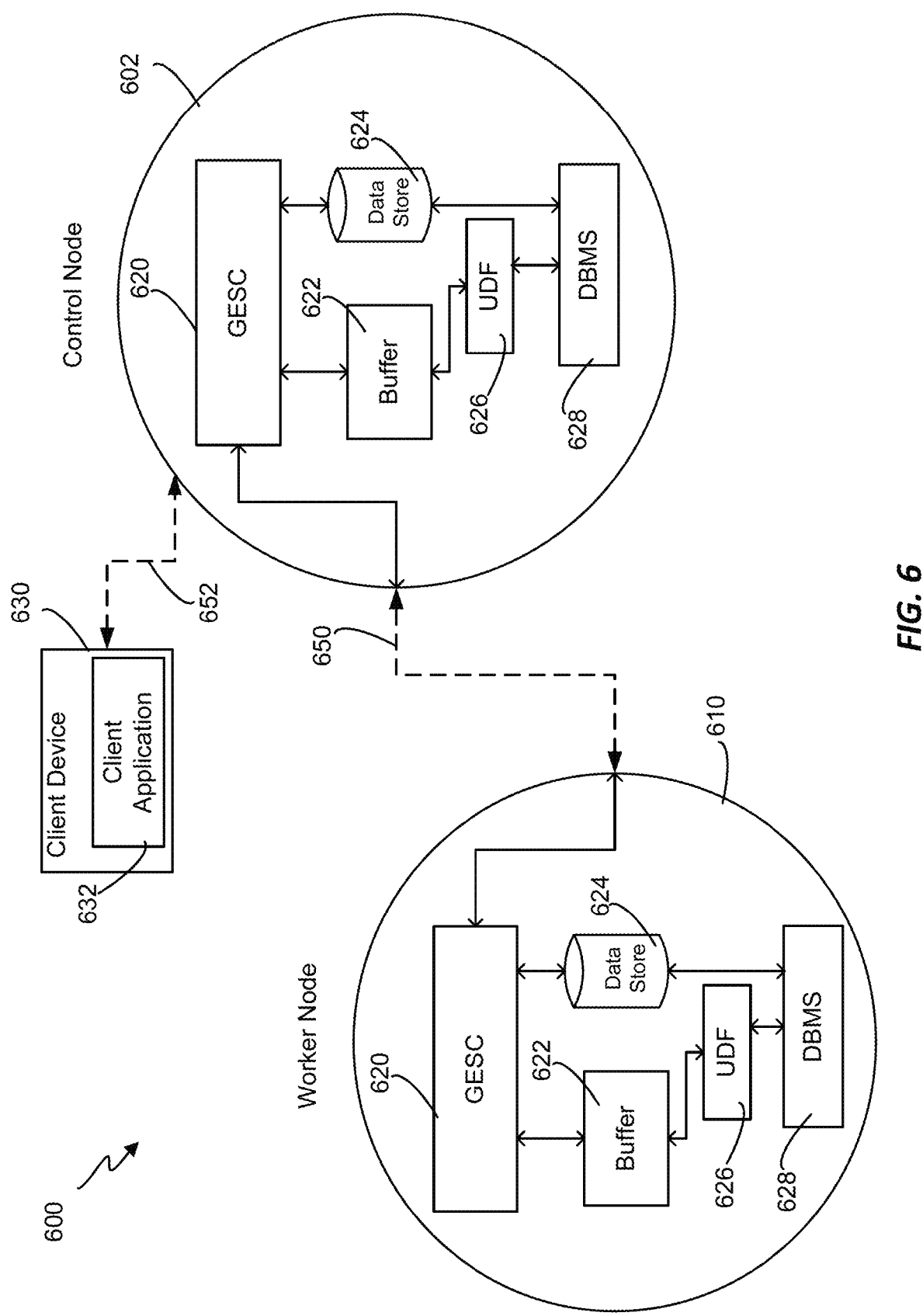
FIG. 6 illustrates a portion of a communications grid computing system including a control node and a worker node, according to at least one embodiment of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
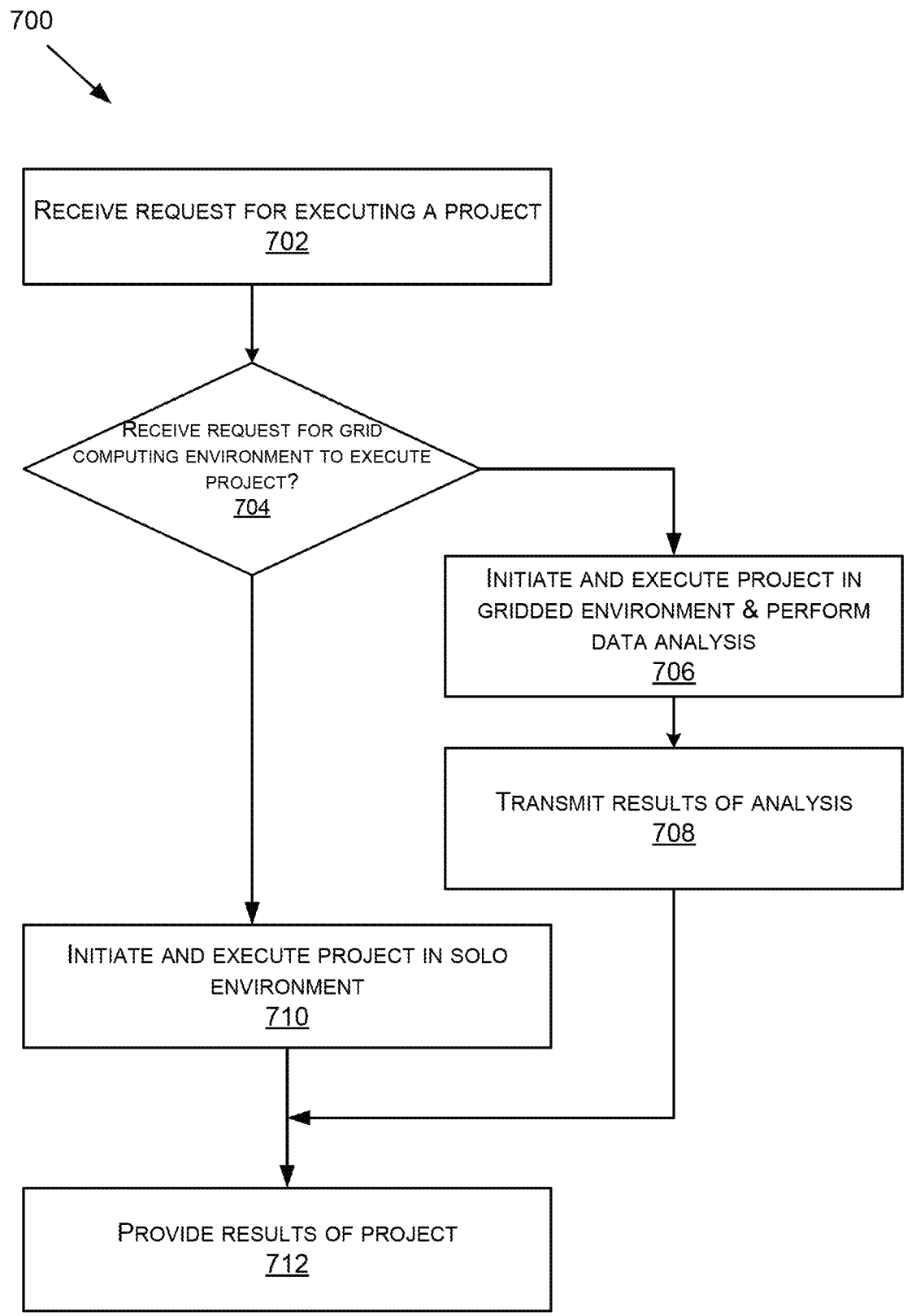
FIG. 7 illustrates a flow chart showing an example process for executing a data analysis or processing project, according to at least one embodiment of the present technology.

FIG. 7 illustrates a flow chart 700 showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024a-c, according to embodiments of the present technology. ESP system 1000 may include ESP device or subsystem 1001, event publishing device 1022, an event subscribing device A 1024a, an event subscribing device B 1024b, and an event subscribing device C 1024c. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
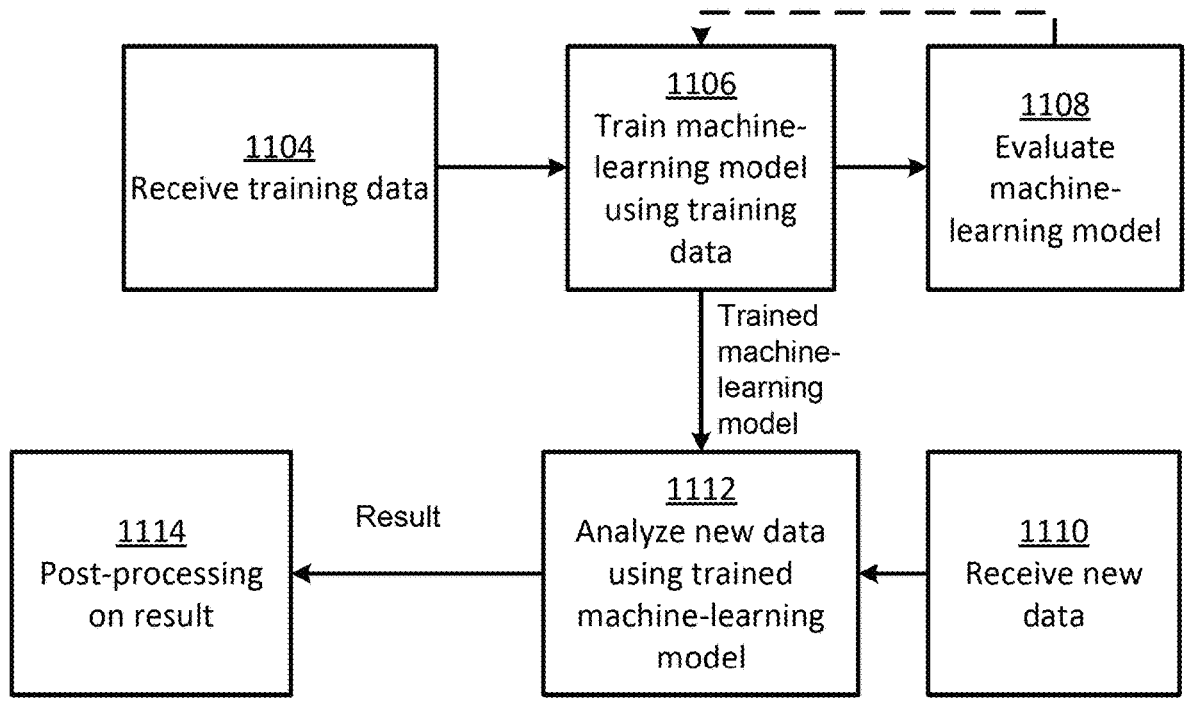
FIG. 11 illustrates a flow chart of an example of a process for generating and using a machine-learning model according to at least one embodiment of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS) 6, SAS Viya 6 of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
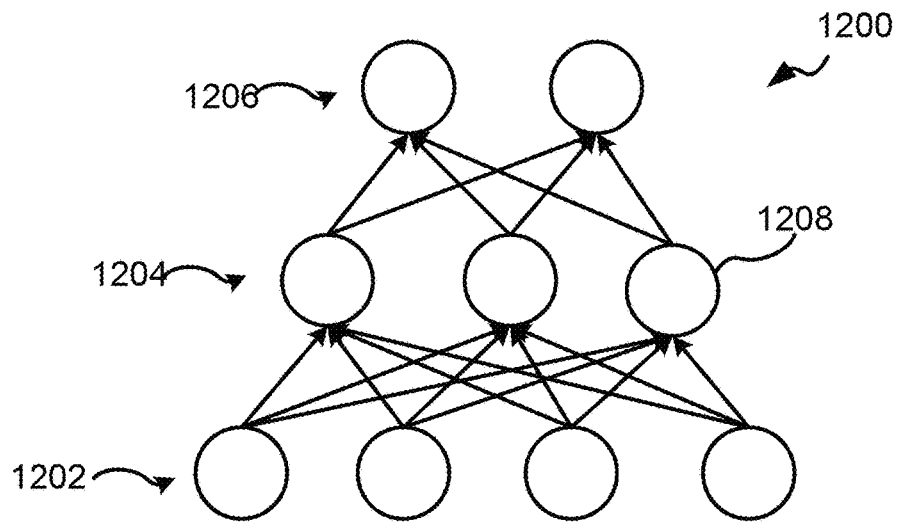
FIG. 12 illustrates an example of a machine-learning model as a neural network according to at least one embodiment of the present technology.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Additionally, or alternatively, one or more embodiments provide approaches for improved variable preparation for modeling. Variables are used in modeling to define factors that can have an influence on output or a response from a model. For instance, feature engineering can be used to determine features that include data associated with variables for defining a model. Traditional approaches to variable preparation are processing and time intensive. That processing and time is not reusable when each model is using unique variables and/or data for forming the model (e.g., different inputs for the variables for training a model). One or more embodiments provide greater agility in preparing variables and variables can be quickly implemented for new models.

Figure 13:
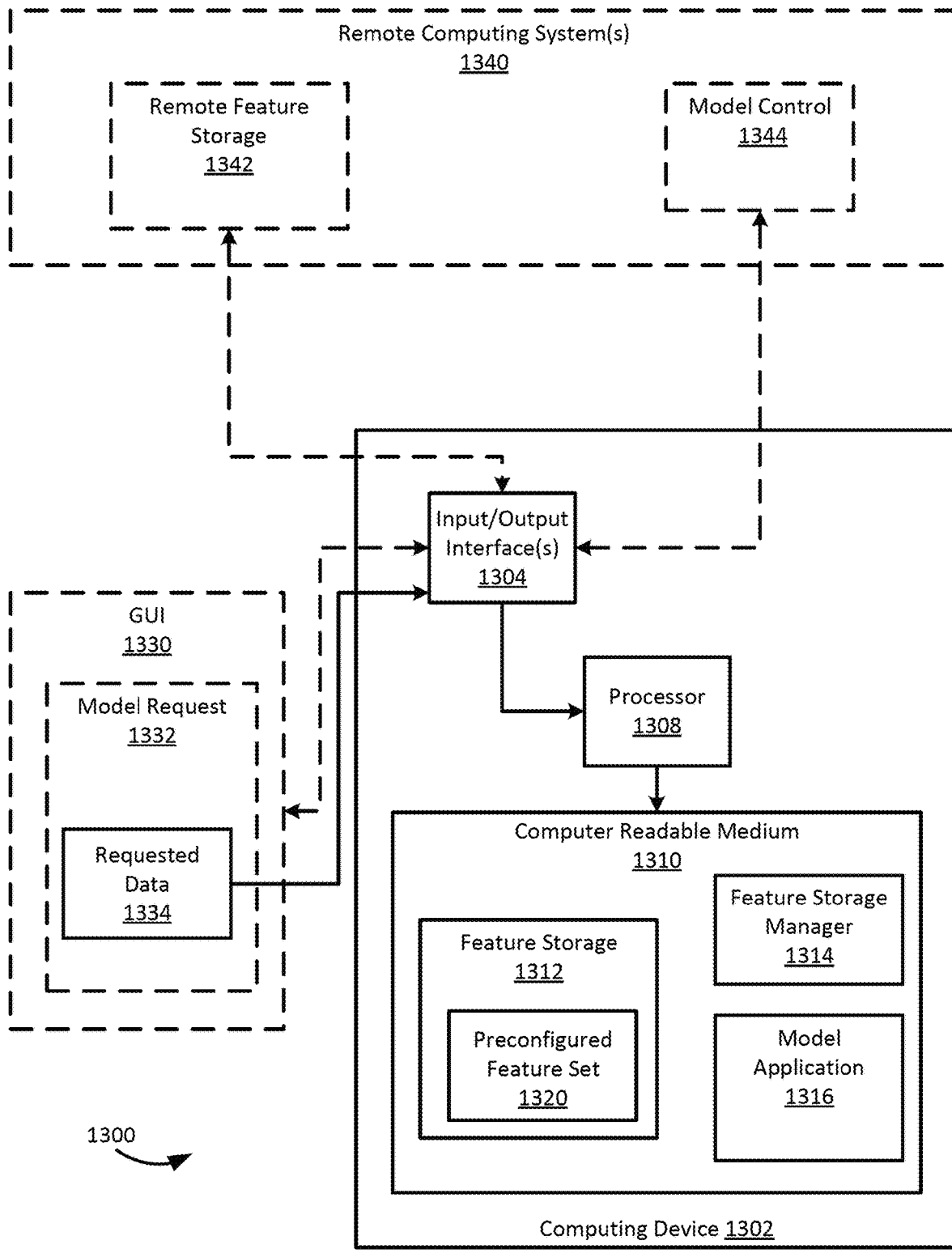
FIG. 13 illustrates a block diagram of a system for controlling development of an analytical model according to at least one embodiment of the present technology.

FIG. 13 illustrates a block diagram of a system for controlling development of an analytical model (e.g., a machine learning model or regression model). The system 1300 is configured to exchange information between devices in the system (e.g., via wired and/or wireless transmission). For example, a network (not shown) can connect one or more devices of system 1300 to one or more other devices of system 1300. Alternatively, or additionally, the system 1300 includes only a single device such as a computing device 1302, or computing device 1302 is itself a computing system.

The computing device 1302 has a computer-readable medium 1310 and a processor 1308. Computer-readable medium 1310 is an electronic holding place or storage for information so the information can be accessed by processor 1308. Computer-readable medium 1310 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Computer-readable medium 1310 can have memory locations that are pre-allocated for specific purposes or dynamically allocated as needed for specific purposes. For instance, computer-readable medium 1310 comprises a feature storage 1312 which is an area of memory allocated for storing feature sets with one or more features. In this example, computer-readable medium 1310 includes a pre-configured feature set 1320. In other scenarios, the feature storage 1312 could have no pre-configured feature sets or multiple pre-configured feature sets. The preconfigured feature set 1320 in this example includes one or more feature definitions. For example, a first feature definition could define an input variable extracted by feature engineering for developing an analytical model. The preconfigured feature set can define computer instructions for locating data associated with the input variable for developing the analytical model. For instance, data for a variable may be stored in computer-readable medium 1310. Additionally, or alternatively, data for a variable may be stored remotely. The data for a variable could be available for retrieval by the computing device 1302 because it is stored, or set-up to arrive, in the feature storage 1312 according to the preconfigured feature set 1320.

For instance, in one or more embodiments, the computing device 1302 comprises one or more input/output interface(s) 1304 for receiving input and/or sending output (e.g., data, features, feature sets). For instance, in one or more embodiments, the system 1300 includes one or more input/output devices (e.g., graphical user interface 1330) or systems (e.g., remote computing system(s) 1340). For example, the one or more remote computing system(s) 1340 may have a remote feature storage 1342 for storing data scheduled to arrive at the computing device 1302. As another example, the remote feature storage 1342 could store features, or feature sets for the computing device 1302 to access. For instance, several research labs at different locations could share a database for downloading or uploading to a feature storage (e.g., remote feature storage 1342) different data, features, or feature sets. As another example, the remote computing system(s) 1340 could include systems for model control 1344 (e.g., platforms for generating a machine learning model and/or for simulating for a machine learning model).

Additionally, or alternatively, the input/output interface(s) 1304 can be used to receive a requested data set for an input variable for developing an analytical model. For example, there may be a particular time period or other range of interest for input data for a variable, and a scientist may request that time period or range for an existing feature. As another example, a researcher may be missing data or missing an input variable that may be helpful for developing a model, and the researcher may input a request to receive a feature that provides that missing information. The requested data 1334 could be part of a model request 1332. It could be entered through a graphical user interface 1330. The graphical user interface 1330 could be integrated into computing device 1302 such that input/output interface(s) 1304 are internal interfaces. For example, a touch screen has an integrated graphical user interface. Additionally, or alternatively, a graphical user interface 1330 could be a part of remote computing system 1340. A single graphical user interface 1330 is shown only as an example. One of ordinary skill in the art will appreciate multiple graphical user interfaces could be used (e.g., one for each user requesting data for features).

In one or more embodiments, processor 1308 executes instructions (e.g., stored at the computer-readable medium 1310) (e.g., in response to information received via input/output interface(s) 1304 or to provide information to devices in system 1300). The instructions can be carried out by a special purpose computer, logic circuits, or hardware circuits. In one or more embodiments, processor 1308 is implemented in hardware and/or firmware. Processor 1308 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 1308 in one or more embodiments can retrieve a set of instructions from a permanent memory device and copy the instructions in an executable form to a temporary memory device that is generally some form of RAM, for example. Processor 1308 operably couples with components of computing device 1302 (e.g., input/output interface(s) 1304 and with computer readable medium 1310) to receive, to send, and to process information.

In one or more embodiments, computer-readable medium 1310 stores instructions for execution by processor 1308. In one or more embodiments, one or more applications stored on computer-readable medium 1310 are implemented in software (e.g., computer-readable and/or computer-executable instructions) stored in computer-readable medium 1310 and accessible by processor 1308 for execution of the instructions.

In one or more embodiments, the computer-readable medium 1310 comprises instructions for implementing a feature storage manager 1314. For instance, a feature storage manager 1314 can be used to store and manage definitions for features in a feature store (e.g., feature storage 1312 or remote feature storage 1342). The feature storage manager 1314 can control one or more responses to user queries (e.g., auto calculation of missing features in the feature storage 1312 based on requested data 1334). For instance, feature storage manager can be used to generate an availability status indicating whether the request data 1334 is available for retrieval according to the preconfigured feature set 1320. Based on the availability status, the feature storage manager 1314 can generate the requested data 1334 such that the requested data is ready for use along with updated metadata. For instance, the computing feature storage manager 1314 can retrieve historical data for the preconfigured feature set 1320 and generate the historical data for the request (e.g., making inferences based on available or retrieved data definitions). For example, if there was a feature available that related to test cases for a disease and the historical data for that feature related to positive test cases over a certain time period, the feature storage manager 1314 can generate data for positive test cases over a different time period for this feature. By being able to use an existing feature with existing data, the computing device 1302 may have processing savings (e.g., avoiding having to go through an extensive process for validating a new feature or ingesting data).

In one or more embodiments, the computer-readable medium 1310 comprises instructions for model application 1316. For instance, the model application 1316 can be used to control development of an analytical model based on the requested data set. For example, the model application 1316 can be used to generate additional features or feature sets for publishing to a model storage for model development. As another example, the model application 1316 can be used to generate a model (e.g., developing input weights or separating data into training and evaluation data). The computer-readable medium 1310 can include other applications or applications can be integrated with other analytic tools (e.g., for generating or analyzing a machine learning model). Merely for illustration, the applications are implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA.

One or more applications stored on computer-readable medium 1310 can be implemented as a Web application. For example, an application can be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

In one or more embodiments, fewer, different, and additional components can be incorporated into computing device 1302 or system 1300. For instance, in one or more embodiments, there are multiple remote computing systems (e.g., one for remote feature storage 1342 and one for model control 1344). As another example, separate interfaces support input/output interface(s) 1304. Additionally, or alternatively, input/output interface(s) 1304 has more than one input interface that uses the same or different interface technology, or more than one output interface that uses the same or different interface technology. As another example, different or additional applications can be present in computer-readable medium 1310 for using features in the feature store (e.g., for visualization and model studies).

In one or more embodiments, the system 1300 implements a method as described herein (e.g., a method shown in FIG. 14) for controlling development of a model.

Figure 14:
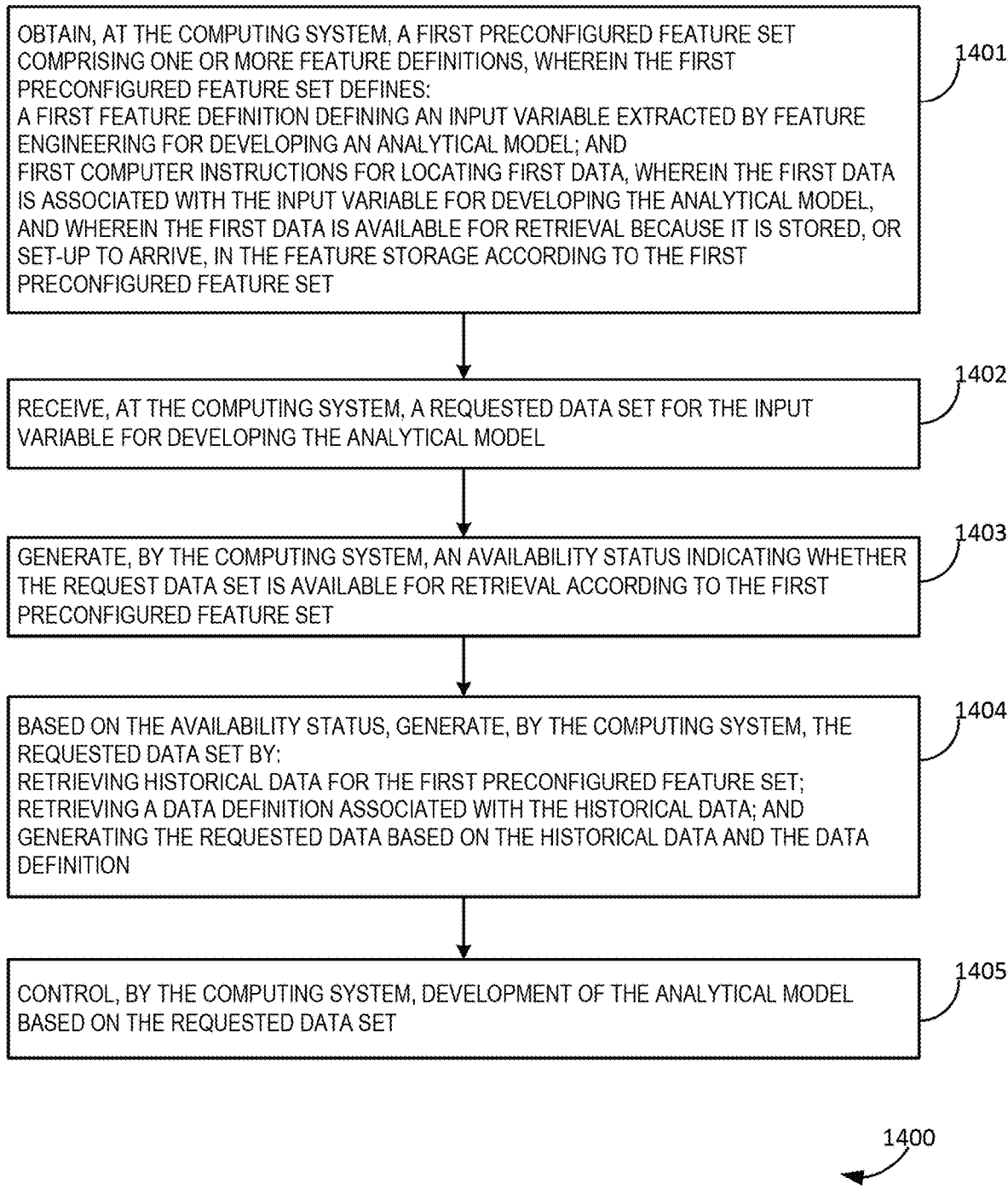
FIG. 14 illustrates a flow diagram for controlling development of an analytical model according to at least one embodiment of the present technology.

FIG. 14 illustrates a flow diagram of a method 1400 for controlling development of a model. The method 1400 includes an operation 1401 for obtaining, at the computing system, a first preconfigured feature set comprising one or more feature definitions. The first feature set can be preconfigured in that it defines a first feature definition defining an input variable. A feature set can have multiple feature definitions for different input variables, or in some cases, there can be a single feature. The input variable can be extracted by feature engineering for developing an analytical model. Multiple input variables can be extracted at once. In this example, the preconfigured feature set defines first computer instructions for locating first data. The first data is associated with the input variable for developing the analytical model. The first data is available for retrieval because it is stored, or set-up to arrive, in the feature storage according to the preconfigured feature set. For instance, data generation may be set-up on a real-time schedule (e.g., close in time to a transaction or sending data frequently) or as part of a batch (e.g., collecting measurements for events on a schedule such as the end of the day or asynchronous and tied to an event such as a flagged transaction). In other examples, data may not yet be available for a feature.

The method 1400 includes an operation 1402 for receiving, at the computing system, a requested data set for the input variable for developing the analytical model. The method 1400 includes an operation 1403 for generating, by the computing system, an availability status indicating whether the request data set is available for retrieval according to the preconfigured feature set. The method 1400 includes an operation 1404 for, based on the availability status, generating, by the computing system, the requested data set. For instance, the computing system can generate the requested data set by retrieving historical data for the preconfigured feature set, retrieving a data definition associated with the historical data (e.g., part of definitions in the first preconfigured feature set), and generating the requested data based on the historical data and the data definition. For instance, if the data is not available with the requested features, it can be generated by the computing system.

The method 1400 includes an operation 1405 for controlling, by the computing system, development of the analytical model based on the requested data set. For example, generated data can be used for training or evaluating model development as a model is being developed in a development and/or as a model is persisted, selected, or updated (e.g., in a production phase).

More or fewer operations can be carried out than described herein. Additionally, operations can be carried out in different orders or simultaneously. For example, operation 1402 can be performed before operation 1401 (e.g., receive the requested data can trigger a computing system to obtain a first preconfigured feature set from remote storage).

Figure 15:
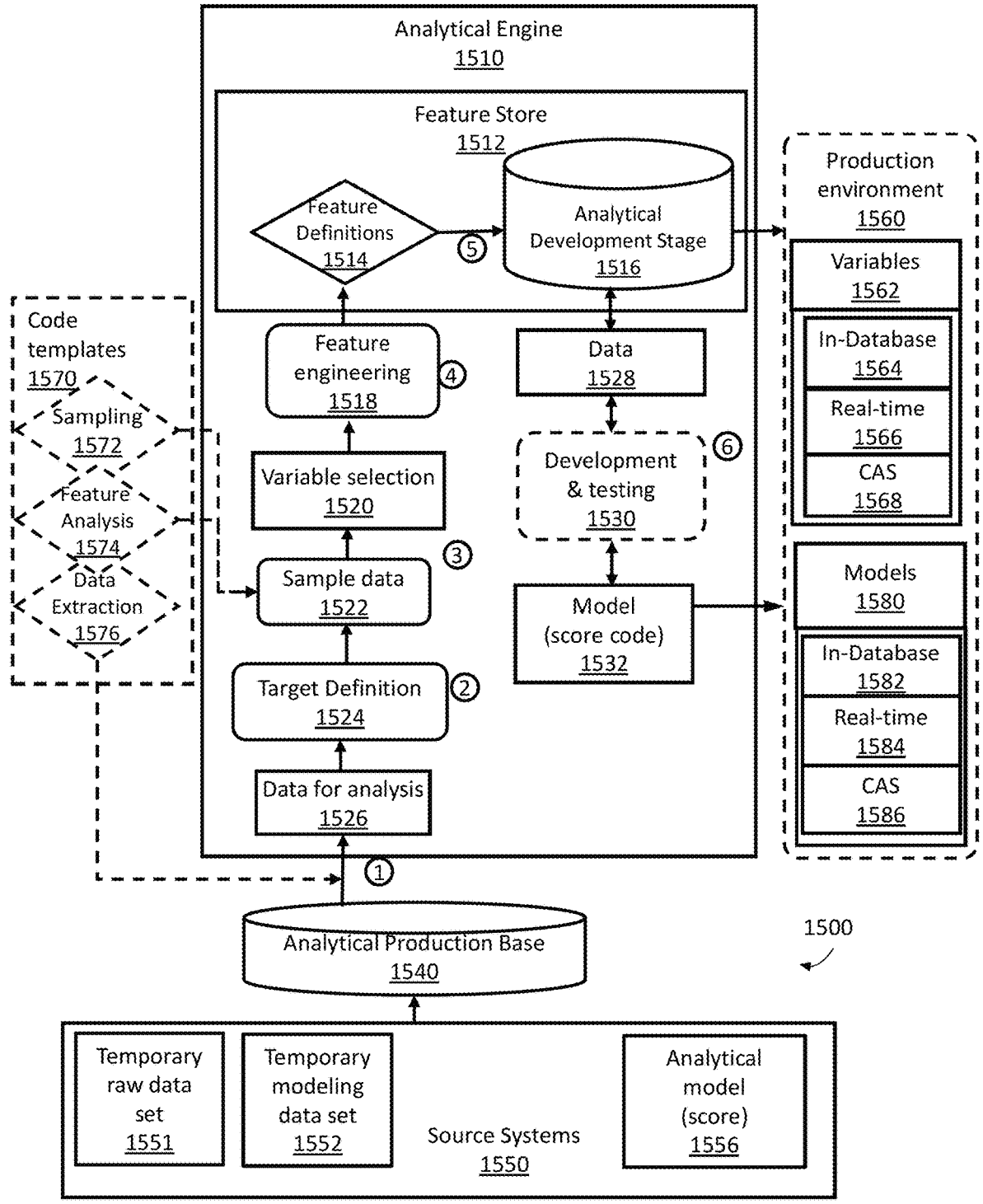
FIG. 15 illustrates an example computer architecture for controlling development of an analytical model according to at least one embodiment of the present technology.

FIG. 15 illustrates an example computer architecture in a system 1500 for controlling development of a model. Feature Store 1512 is an application that is a part of an environment that gives the model developer the ability to either utilize stored information about features or create new feature definitions. In this example, the Analytical Engine 1510 is a computing system (e.g., system 1300 or computing device 1302 in FIG. 13) used to support the Feature Store 1512. For example, the Analytical Engine 1510 may be a CAS® Analytical Engine.

The Feature Store 1512 can implement feature storage and feature storage manager (e.g., feature storage manager 1314 and feature storage 1312 in FIG. 13). Operations for an example workflow are numbered in system 1500. In a first operation, the Analytical Engine 1510 receives Data for Analysis 1526. In this example, the data selection for the Feature Store 1512 can come from the Analytical Production Base 1540. For instance, the Analytical Production Base 1540 can download and retrieve data sets from source systems 1550 to the memory of the Analytical Engine 1510. Example source systems may include temporary raw data set 1551 and temporary modeling data set 1552. The Data for Analysis 1526 can be retrieved using wired or wireless connections. For example, the Analytical Engine 1510 may be part of a system 1500 implemented using cloud technology. The source systems 1550 may include other instructions useful for the Feature Store 1512 or computing systems implementing or supporting Feature Store 1512 such as Analytical Engine 1510. For example, the source systems 1550 may include analytical model 1556. The analytical model 1556 may have output such as a score (e.g., a model score code).

In a second operation, one or more Target Definitions 1524 are determined (e.g., by retrieving historical values of one or more explained variables). In a third optional operation, Variable Selection 1520 occurs. For instance, there is optional sampling of data. Code Templates 1570 can optionally be used to provide templates of sampling processes as part of a project, in accordance with the best analytical practices and templates of variable selection processes to accelerate the processes of model parameters estimation. For instance, the Code Templates 1570 may contain computer instructions for Sampling 1572 and Feature Analysis 1574. Code Templates 1570 can also be used for Data Extraction 1576 (e.g., for selecting Data for Analysis 1526).

A fourth operation comprises Feature Engineering 1518. For instance, a user such as an Analyst using the Feature Store 1512 can define new variables or select definitions from among those available in a repository based on the results of the previous steps, i.e., extending the set of features and aggregates used to estimate model parameters. Variables can be defined in a variety of forms (e.g., both in the form of code as well as in the form of diagrams such as SAS Event Stream Processing diagrams, especially for events).

The Feature Store 1512 can be used to register and determine Feature Definitions 1514. For instance, the Feature Store 1512 can be used by a user for registration of a definition and calculation of variables. For instance, the user registers the code defining the variable in the code repository (e.g., a GIT repository).

In a fifth operation, a feature store manager generates input tables for modeling and testing. For instance, an analytical development stage 1516 can be used to generate and store a new feature set (e.g., in a feature storage 1312 of FIG. 13). The same variable definitions can be used in the production process of running models, both in batch and real time modes. Variable definitions grouped into feature sets or as a feature list can be searchable by the end users of the application and can be selected for further processing in different use case scenarios some of which are described herein.

In a sixth operation, modeling is performed. For instance, a user can select generated or calculated data (such as Data 1528) to create models 1532 or other model aspects such as score codes for scoring models. Operations 1530 for development and testing can be used to improve or test models.

A production system implementing a Production Environment 1560 can be used to store the generated features (Variables 1562) and developed Models 1580. The Variables 1562 and Models 1580 can be deployed in the Production Environment 1560. The Variables 1562 can be used or generated using a variety of engines such as relational database (e.g., in-database 1564), real-time (streaming) engine 1566, or CAS® in-memory engine 1568. Similarly, the models can be scored using various engines (e.g., in-database 1582), in real-time engine 1584, or CAS® engine 1586. A searchable database can provide a unified view of the data (e.g., a unified approach to evaluating historical data for training and scoring a model). In creating new features and variables, where there is no unified way to evaluate historical and production data, data scientists do this in their own ad hoc manner. A feature storage 1312 can provide for preconfigured feature sets (e.g., in a single or multiple searchable metadata repositories). The database can be used to track information providing an auditable process and data lineage.

The Feature Store 1512 uses an innovative approach to managing metadata of available data used for model development as well as model execution. The approach allows for defining both real-time event data and batch evaluations which is framework-agnostic. The Feature Store 1512 can be user-friendly. For example, the Feature Store 1512 can provide one click training data evaluation for batch and real-time variables and one click deployment to production environment from definition without having to recode or manually translate.

Figure 16A:
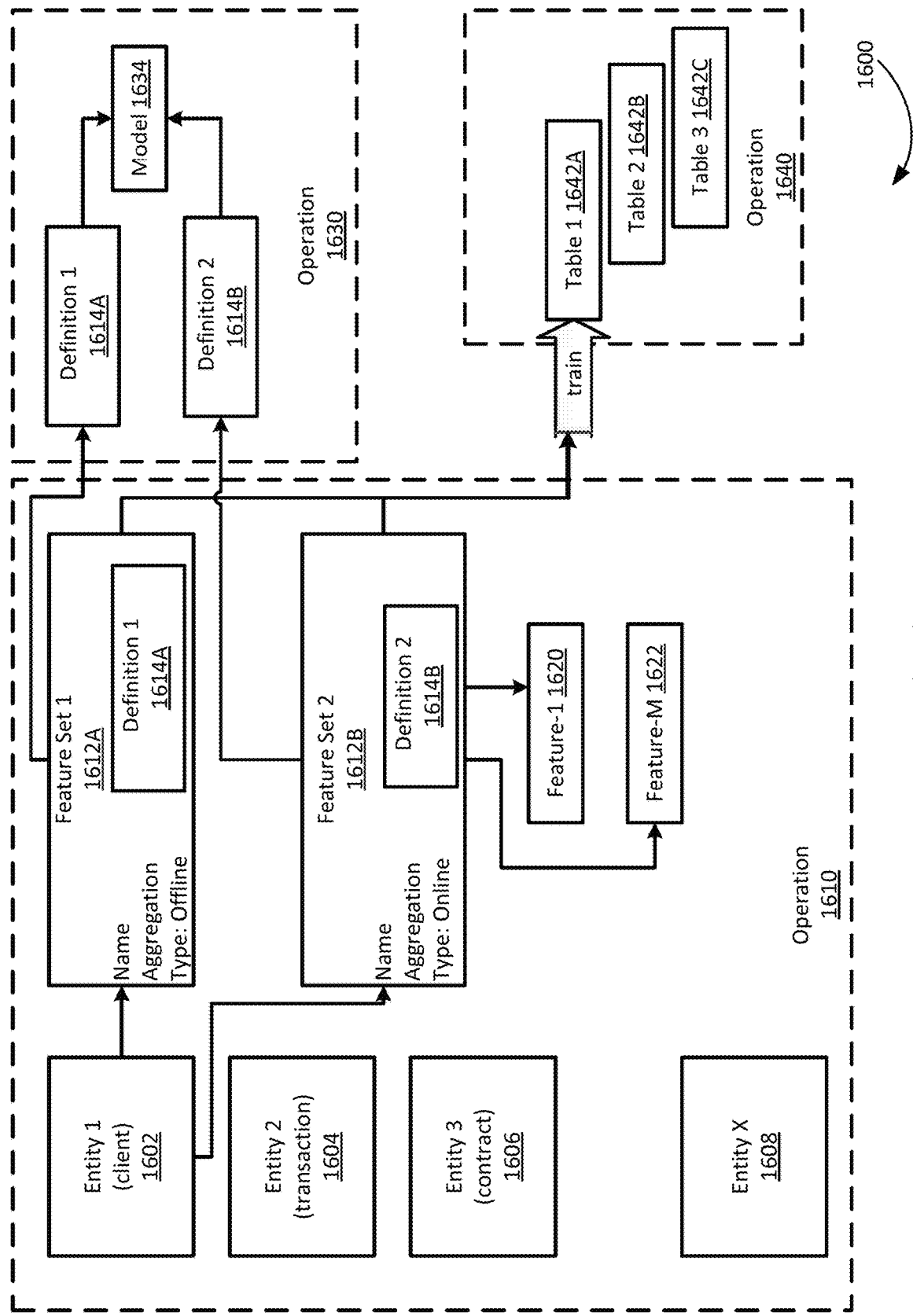
FIG. 16A illustrates an example flow diagram for controlling development of an analytical model according to at least one embodiment of the present technology.
Figures 16B, 16C:
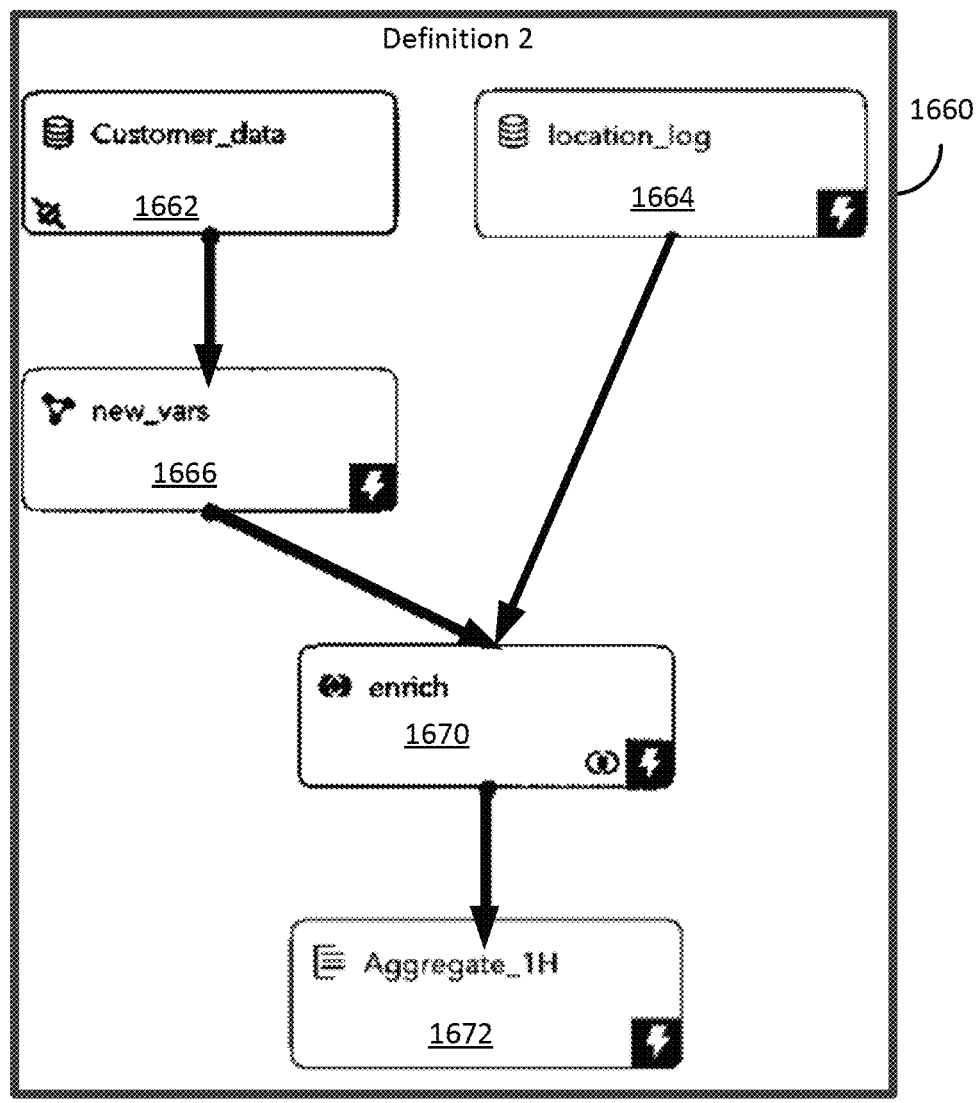
FIGS. 16B and 16C illustrate example graphical user interface representations of feature set definitions according to at least one embodiment of the present technology.

FIG. 16A shows an example flow diagram 1600 for user scenarios that can be implemented by Feature Store 1512. The flow diagram 1600 can be used for controlling development of a model. In an operation 1610, feature sets 1612 are accessed or created. The feature sets 1612 may comprise information for the user to be able to identify the correct feature set. For example, the feature set in this example includes a name, aggregation information (e.g., for aggregating measurements taken for a variable of a feature), and whether data is accessed online or offline. For instance, real-time data may be provided via an online connection. These feature sets 1612 can be associated with one or more entities (e.g., a Client Entity 1602, a Transaction Entity 1604, a Contract Entity 1606, or other types of entities 1608). Additionally, or alternatively, the feature sets 1612 can comprise one or more definitions 1614 for the computing system to be able to understand the Feature Sets. The user can select one or more features from a feature set (e.g., Feature-1 1620 to Feature-M 1622). FIGS. 16B and 16C illustrate example graphical user interface representations of portions of feature set definitions. The user can use the selected features in an operation 1640 to generate historical data based on the feature sets 1612 (e.g., train). The training processing can be used to generate, for example, one or more data tables, e.g., based on historical data, which can be used for modeling. For instance, the data tables 1642 can comprise requested data used for training models or evaluating models.

Additionally, or alternatively, in operation 1630, feature sets can be published as new feature sets. For example, definitions 1614 can be published with new feature sets for production and deployment (e.g., for developing, training, or updating a model 1634). Once a feature set is published, the definitions within the feature sets can be used by the computing system to create historical tables and generate new tables (e.g., based on ingesting data on a schedule or provide service for on-line features to be consumed by models via rest application programming interface (API)).

FIGS. 16B and 16C provide example definitions such as the definitions 1614 described in FIG. 16A. For instance, a portion of a definition 1650 in FIG. 16B is displayed in a graphical user interface in a computer code form. Definitions can be written in one or more languages (e.g., SAS® DS and DS2, Python®, ESP). In FIG. 16C, the definition 1660 can be displayed in a graphical user interface as an event stream processing (ESP) diagram for conveying meaning to a user inspecting the code. Individual components of the ESP diagram can be selected for further inspection. For example, data coming from customer data source 1662 is streamlined and enriched with calculation of new variables 1666 introduced in the feature set. Customer location data from location log 1664 is then joined to enrich final feature set using enrichment tools 1670. The feature set can then also be extended by adding time-based aggregates, e.g. hourly sum or average of an aggregate tool 1672.

Figure 17:
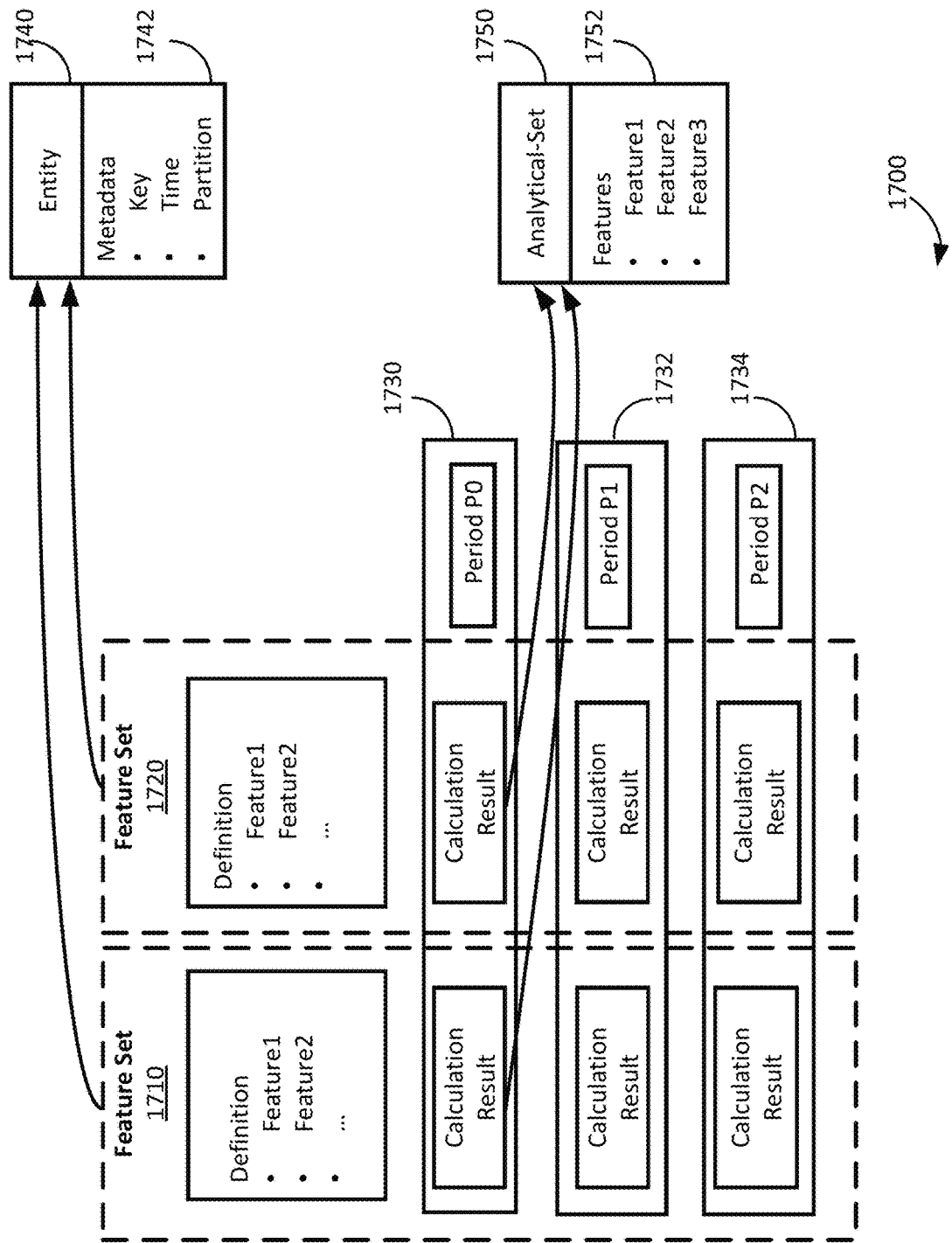
FIG. 17 illustrates an example generation of an analytical data set according to at least one embodiment of the present technology.

Definitions can be used by a computing system for generating analytical sets (e.g., ones that have features or data generated from multiple feature sets). FIG. 17 illustrates an example generation of an analytical data set (e.g., Analytical Set 1750). In this example, the computing system associates a first preconfigured feature set (e.g., Feature Set 1710) and a second preconfigured feature set (e.g., Feature Set 1720) associated with an entity (e.g., Entity 1740). The entity can represent, for example, a real-world object, event, person, or business. For example, as shown in FIG. 16A, the entities included clients, transactions and contracts. In one or more embodiments, a computing system generates requested data set (e.g., where the data set is not already available) by generating an analytical data set (e.g., Analytical Set 1750) for the entity comprising data pertaining to each of the first preconfigured feature set and the second preconfigured feature set. For example, calculation results from a specific period 1730 are used for each of feature set 1710 and feature set 1720, but data from other periods such as periods 1732 and 1734 are excluded. The Analytical Set 1750 can then have its own features 1752 and may be associated with the entity 1740. The entity may have other metadata 1742 associated with it such as pertaining to a key, time, or partition. For instance, a key can be an identifier used to associate an entity with particular features or feature sets (e.g., new Analytical Set 1750). Time can be an aggregation granularity (e.g., monthly, hourly, minutely). Partition could be a variable or feature which can be used for partitioning the data (e.g., date of opening the bank account). Partitioning can be useful for processing data faster (e.g., data can be distributed into partitions and data can be retrieved in partitions). Once the Analytical Set 1750 is set up (e.g., with its own features 1752), it can be used as input data to control development of an analytical model. Accordingly, embodiments can be used to generate new feature sets.

Figure 18A:
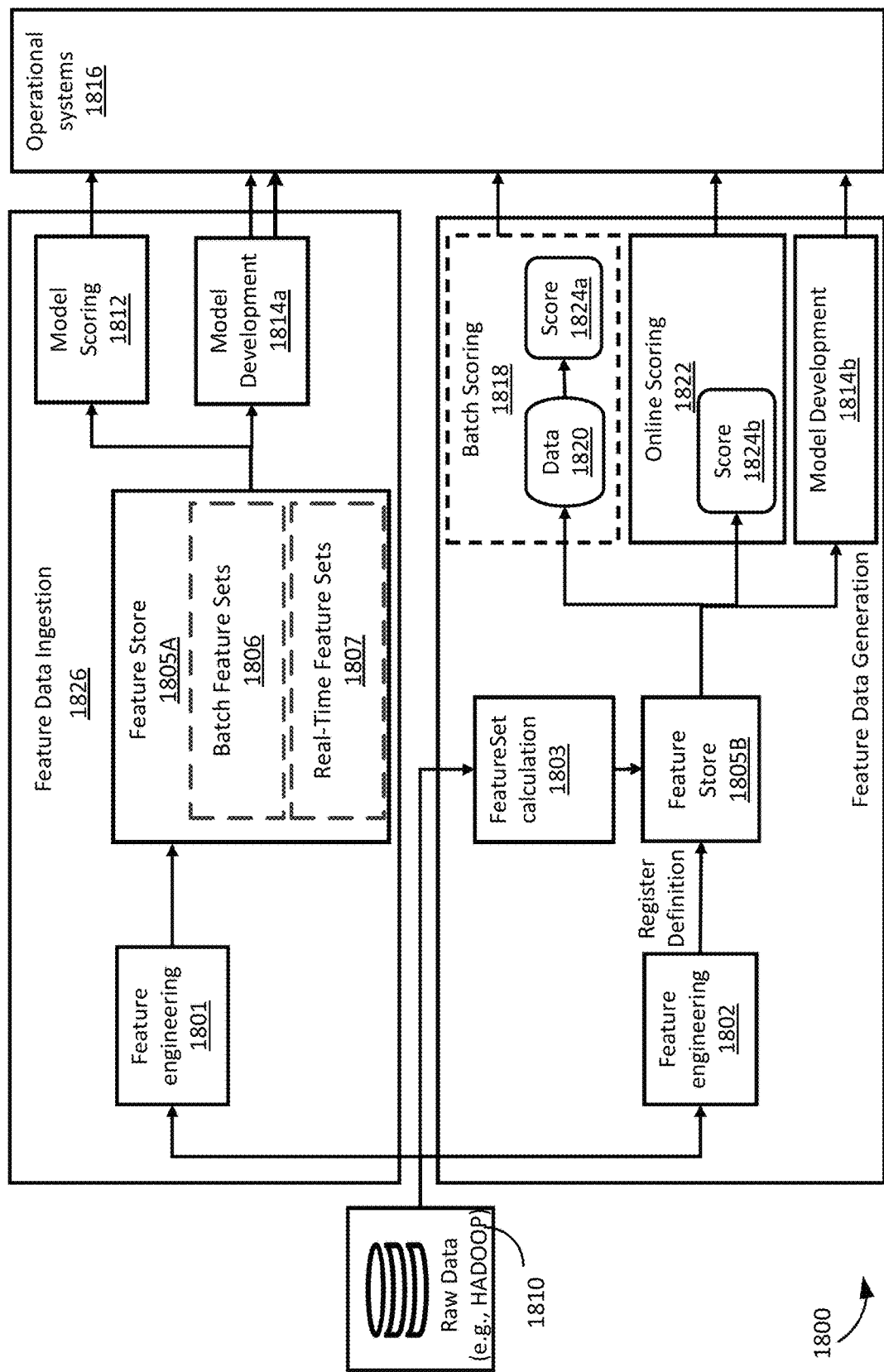
FIGS. 18A-18C illustrate example flow diagrams for controlling a model according to at least one embodiment of the present technology.
Figure 18B:
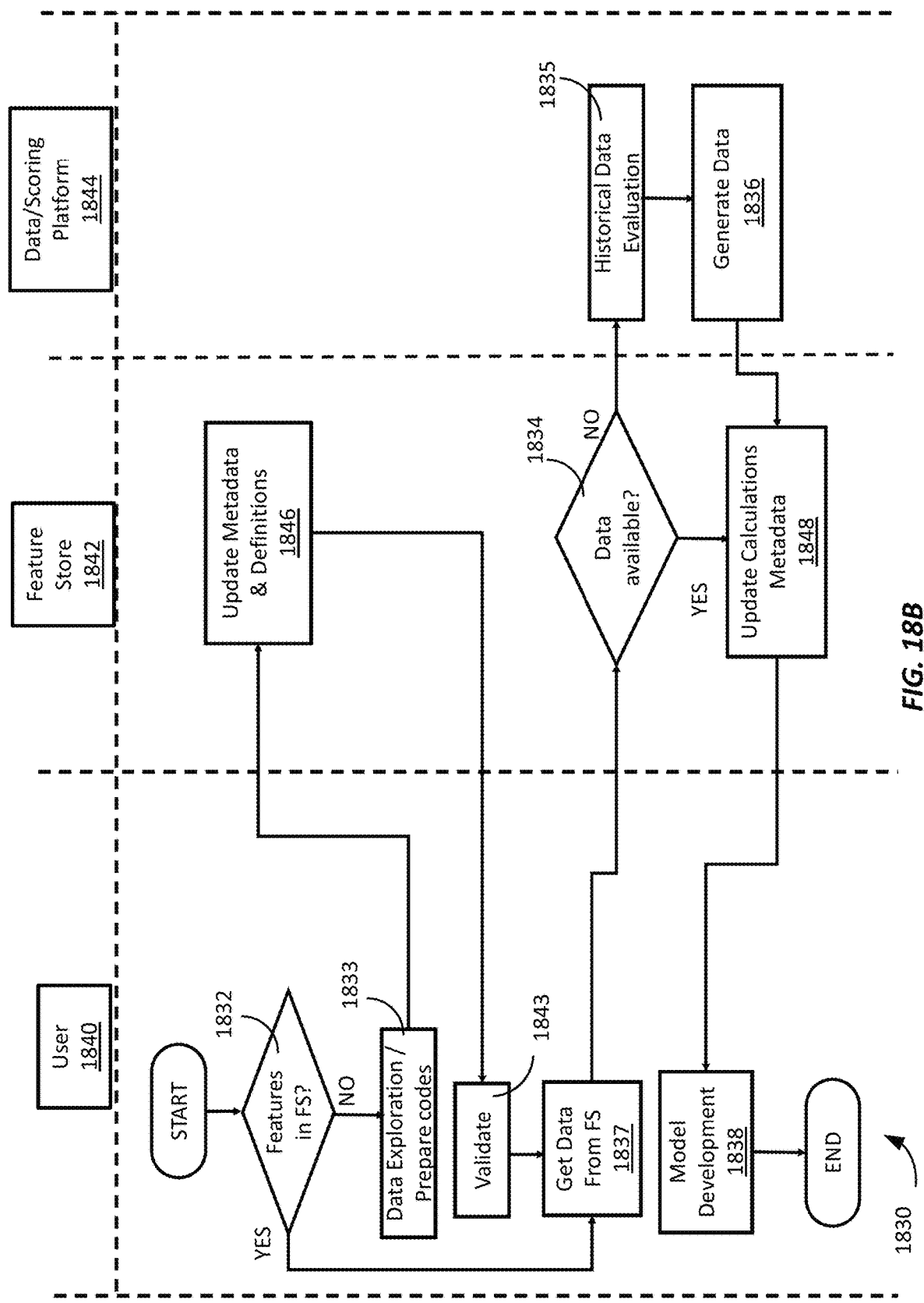
Figure 18C:
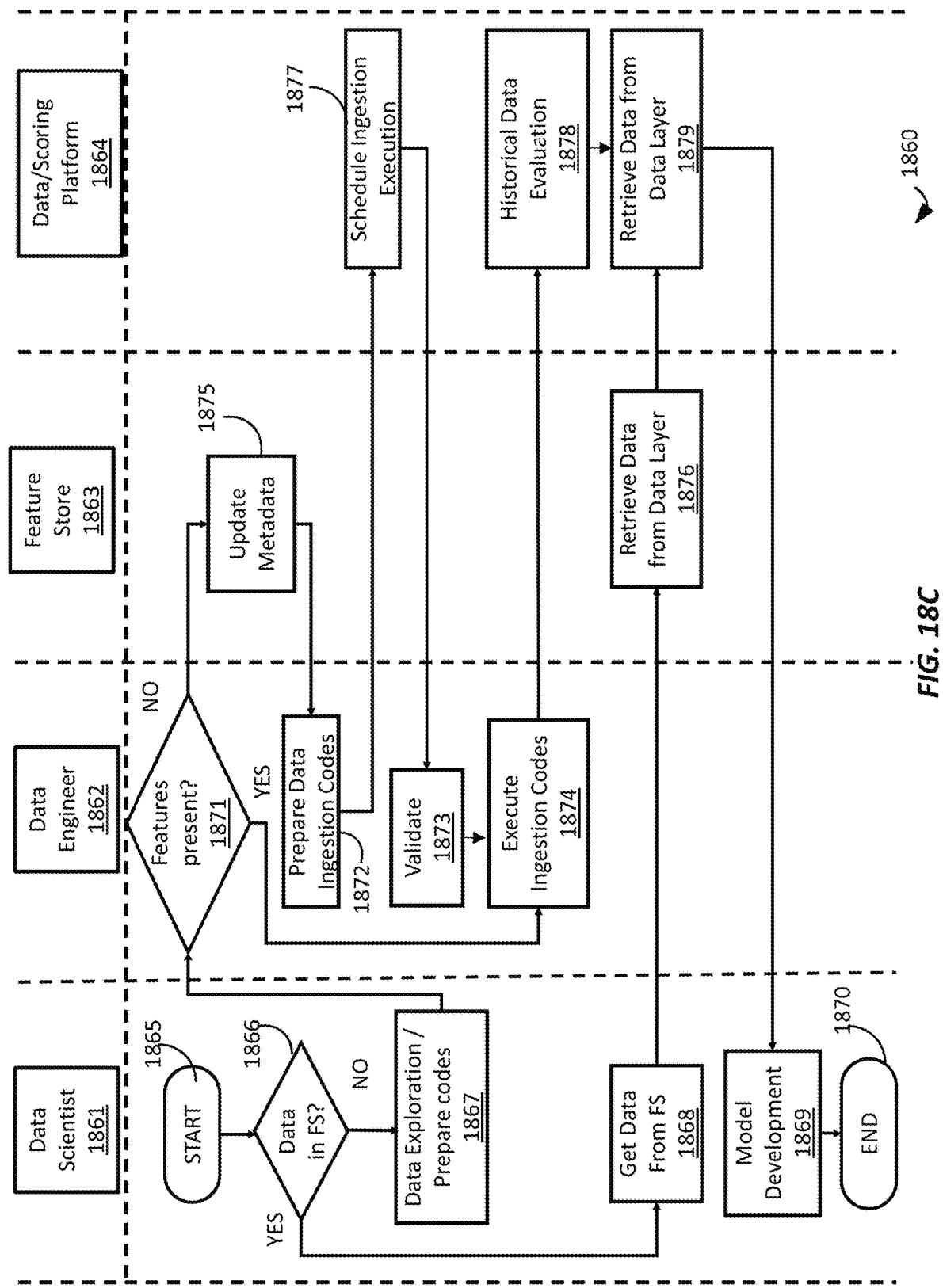

FIGS. 18A-18C illustrate example flow diagrams for controlling development of a model using generated data and feature sets as described herein. FIG. 18A illustrates an example system 1800 providing model scoring and model development to an operational system 1816. The operational systems can use this information for one or more functions such as generating visualizations, model studies, or implementation of analytical models. Additionally, or alternatively, the operational system 1816 could be one that utilizes models (e.g., providing a production environment such as the Production Environment 1560 in FIG. 15). To name a few examples, the operational system 1816 could be a testing system using models (e.g., using models to develop designs for testing manufacturing equipment or vehicles). As another example, the operational system 1816 could be a simulating system using a model to simulate expected responses to testing or classifications. As another example, the operation system 1816 could be a monitoring system using models to monitor (e.g., monitoring operations of a financial institution, monitoring disease spread, or monitoring fraud activity as part of crime investigations).

The operational systems 1816 can receive developed models and model scoring from different systems (e.g., feature data ingestion system 1826 and feature data generation system 1828). Feature data ingestion system 1826 is used to generate features using traditional paths in which features are exported using featuring engineering processes 1801. In some cases, feature engineering processes could include using image capture tools or sensors to capture aspects of operational system 1816 to determine important variables or data for developing a model. Determined features from these variables and data can be stored in a feature store 1805A. The feature store 1805A can store different types of features. For example, a feature store 1805 can store batch feature sets 1806 that receive batch data sets for variables associated with a feature (e.g., at fixed points on a schedule). For example, batch feature data could include output of a manufacturing system collected at the end of the day or transactions generated for a business collected monthly. A feature store 1805 can also store real-time feature sets that receive data for variables associated with a feature in response to certain triggering conditions (e.g., to achieve real-time or near real-time data as its generated). For example, it could receive data from a weather monitoring station sending data related to weather forecasts or temperature measurements as the weather or temperature changes, or on a frequent periodic schedule. As another example, a radar system could send data for real-time data as events are detected, or on a periodic schedule. The system 1826 can use the features in the feature store 1805A for model scoring 1812 and model development 1814.

A feature storage manager can improve the process of ingesting data in the feature store for registered features. For instance, in the feature data generation system 1828, feature engineering 1802 can be used to register a definition of a feature in the feature store 18056. This way data, such as raw data stored in a database 1810 (e.g., a Hadoop database), can be used to produce requested data for features using feature set calculation operation 1803. In this way the feature data generation system 1828 can generate the data rather than just ingesting existing or scheduled data as in feature data ingestion system 1826. For instance, if the feature store 1805B contained a preconfigured feature set defining first data that is an original real-time data measurement for the input variable (e.g., over a first time period), and a user requested data pertaining to different real-time data measurements for the input variable (e.g., over a second time period), the feature set calculation operation 1803 can be used to generate the requested data set based on the original real-time data measurement. Once the features and requested data is in the feature store 1805B, the feature data generation system 1828 can be used for model development 1814 and model scoring. For instance, if the real-time data measurements were received online, online scoring operations 1822 could be used to produce a score 1824*b*. As another example, if instead batch data was requested, batch scoring operations 1818 could be used for data 1820 to produce score 1824*a*. Any score or developed models by feature data generation system 1828 can be provided to operational system 1816.

In this example two systems (feature data generation system 1828 and feature data ingestion system 1826) were shown to provide models and/or scoring to operational system 1816. In other scenarios, one system could be used to produce functions of both the feature data ingestion system 1826 and the feature data generation 1828, or a given system could be used alone or with other systems not shown.

FIG. 18B shows an example method that could be implemented by a computing system (e.g., a feature data generation system 1828 shown in FIG. 18A). The method in this example is implemented by a user-side device 1840, a feature store (FS) 1842, and a data/scoring platform 1844. The user-side device 1840 could be operated by a user such as a data scientist. The method 1830 includes an operation 1832 of obtaining one or more preconfigured feature sets in a feature store 1842 and determining whether features are in the feature store 1842. In this example, a user-side device 1840 sends a request for features in a feature store 1842 in an operation 1832. If there are features in the feature store 1842, a user-side can request data from the feature store related to the feature in an operation 1837.

In an operation 1834, a computing system (e.g., feature store 1842) checks whether the requested data set is available for retrieval according to the preconfigured feature set. The computing system can generate an availability status (i.e., "No") indicating that the requested data set is not available for retrieval according to the preconfigured feature set. For instance, there may be metadata, or no metadata associated with a preconfigured feature set pertaining to the requested data. Metadata may be data indicating information about another data set (e.g., if the data set where text messages, metadata could include they are text messages over a certain time period but may not have the content of the actual text messages). This absence of appropriate metadata can be used to determine whether the requested data set is available for retrieval. For instance, the presence or absence of needed metadata may be an implicit indication of availability status. For example, the available data may be specific to a particular time period and the requested data set is requested for a time that is different (e.g., in overlapping time period or in a time period that does not include the particular time period available). For instance, if a computing system stores in metadata that calculations were performed for data received in January, if another computing system asks for February, a computing system will execute evaluations based on the definition for this period and information stored in metadata since the metadata indicates that only January is available. In other words, the computing system has no computer instructions available for locating the requested data set stored, or set-up to arrive, in the feature storage, and must determine or extrapolate the data needed.

The content of the metadata can be customized to the particular scenario. For instance, as another example, a data set may be stored over a particular ph range and the metadata may indicate that ph range. Then requested data may be for a different ph range then indicated by the metadata.

When the availability status indicates the requested data set is not available, the computing system in an operation 1835 can evaluate historical data and retrieve data 1836 useful for generating the requested data. For instance, the computing system can generate the requested data set for the requested time period. Information used for generating the requested data may be stored remote from the computing system generating the requested data. For example, a computing system checking the availability of data may obtain the preconfigured feature set from a remote source and the obtained feature set may have computer instructions for retrieving the historical data.

In operation 1848, the computing system updates calculations and metadata for the generated data or for data already available in the feature store 1842. The data can then be used in an operation 1838 to develop a model. In this way the method 1830 can be used to generate data for a registered feature.

Sometimes in the operation 1832, a computing system determines a feature is not present in a feature store (e.g., the feature store 1842 and/or user-side device 1840 receives an indication that a feature is not in a feature storage). In this case the user-side device 1840 can be used for data exploration or preparing codes to generate a feature and ingest data in an operation 1833. The feature store 1842 can be used to update metadata and definitions for registering a feature in an operation 1846. The feature can then be validated in an operation 1843 and data for the feature store obtained. Therefore, it is not necessary that features, or data be present in example systems to create new feature or generate new data.

FIG. 18C illustrates an example method 1860 where data is ingested (e.g., feature data ingestion system 1826 in FIG. 18A). In this example, multiple users are used to ingest data. For instance, a data scientist may use a device 1861 to request data for model development, and a data engineer may also interact with the device or may have their own device 1862 for generating computer instructions for ingesting new data. In this example, the data scientist requests, using device 1861, data from a feature store in operation 1866. If the data is present, the data scientist can use device 1861 to retrieve data from a feature store 1863 in an operation 1868. In response, the feature store 1863 can request to retrieve data from a data layer in an operation 1876, and the data and/or scoring platform 1864 can be used to retrieve data from data layer in an operation 1879 for use in model development by the data scientist in an operation 1869.

If the data is not present, the data scientist may need to engage in operations 1867 related to data exploration or preparing codes to ingest the data. A data engineer may use a device 1862 to determine whether a feature is present related to the requested data in an operation 1871. If the feature is present, then the device 1862 can be used to execute the ingestion codes in an operation 1874. If the feature is not present, the feature store 1863 can be used to update metadata related to creating the feature in an operation 1875. The data engineer may use device 1862 to prepare data ingestion codes and may use a data and/or scoring platform 1864 to schedule ingestion execution in an operation 1877. The data can be validated in an operation 1873 and ingestion codes executed in an operation 1874.

Once ingestion codes are executed in operation 1874, the data and/or scoring platform 1864 can be used to evaluate historical data in an operation 1878, retrieve data from a data layer in an operation 1879, and develop a model in an operation 1869. In some embodiments it may be preferable to use methods to generate data (e.g., in FIG. 18B) rather than ingest the data.

Figure 19A:
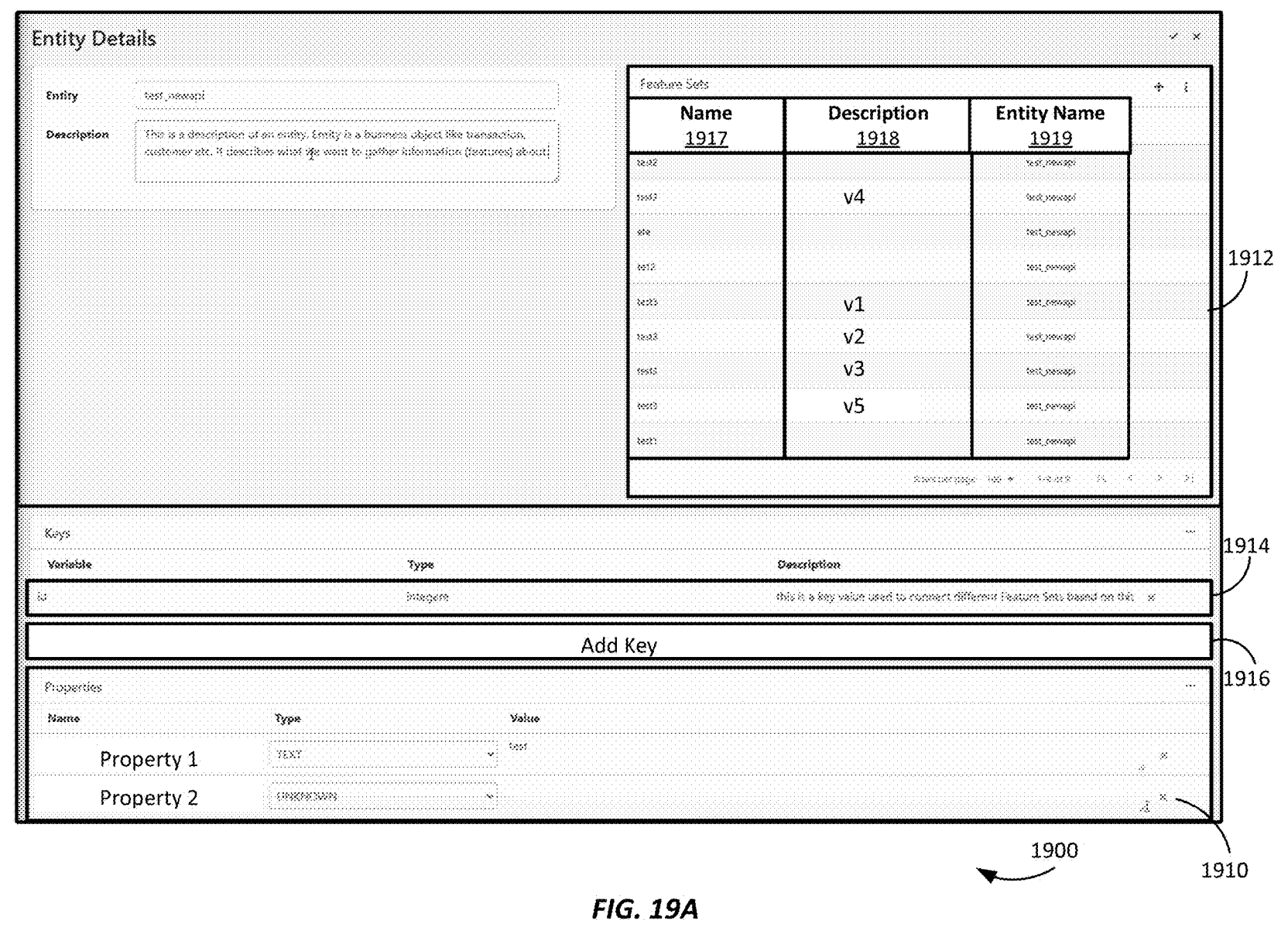

FIGS. 19A-19D illustrate an example graphical user interface for generating data associated with an entity. FIG. 19A shows a graphical user interface 1900 related to an entity. Multiple feature sets can be associated with an entity. For example, multiple feature sets can be associated with a given key value and these key values can be associated with an entity. For instance, a user can select the add key option 1916. A computing system can receive a pre-configured feature set by receiving a user indication of a key associating one or more preconfigured feature sets. For example, the key 1914 is associated with the entity "test_newapi"). As shown in graphical user interface 1900, a portion 1912 displays feature sets now associated with an entity (e.g., due to the associated key). The feature sets have a description column 1918 for displaying optional user-interpretable descriptions of multiple preconfigured feature sets identified in the name column 1917. The entity name column 1919 shows they are associated with the entity displayed in the graphical user interface 1900. An entity can also have various custom properties associated with the entity (e.g., properties of different type listed in properties area 1910). There can be other information pertaining to an entity such as additional description of the entity and/or a database identifier to point to a database that contains base information of this entity.

Figure 19B:
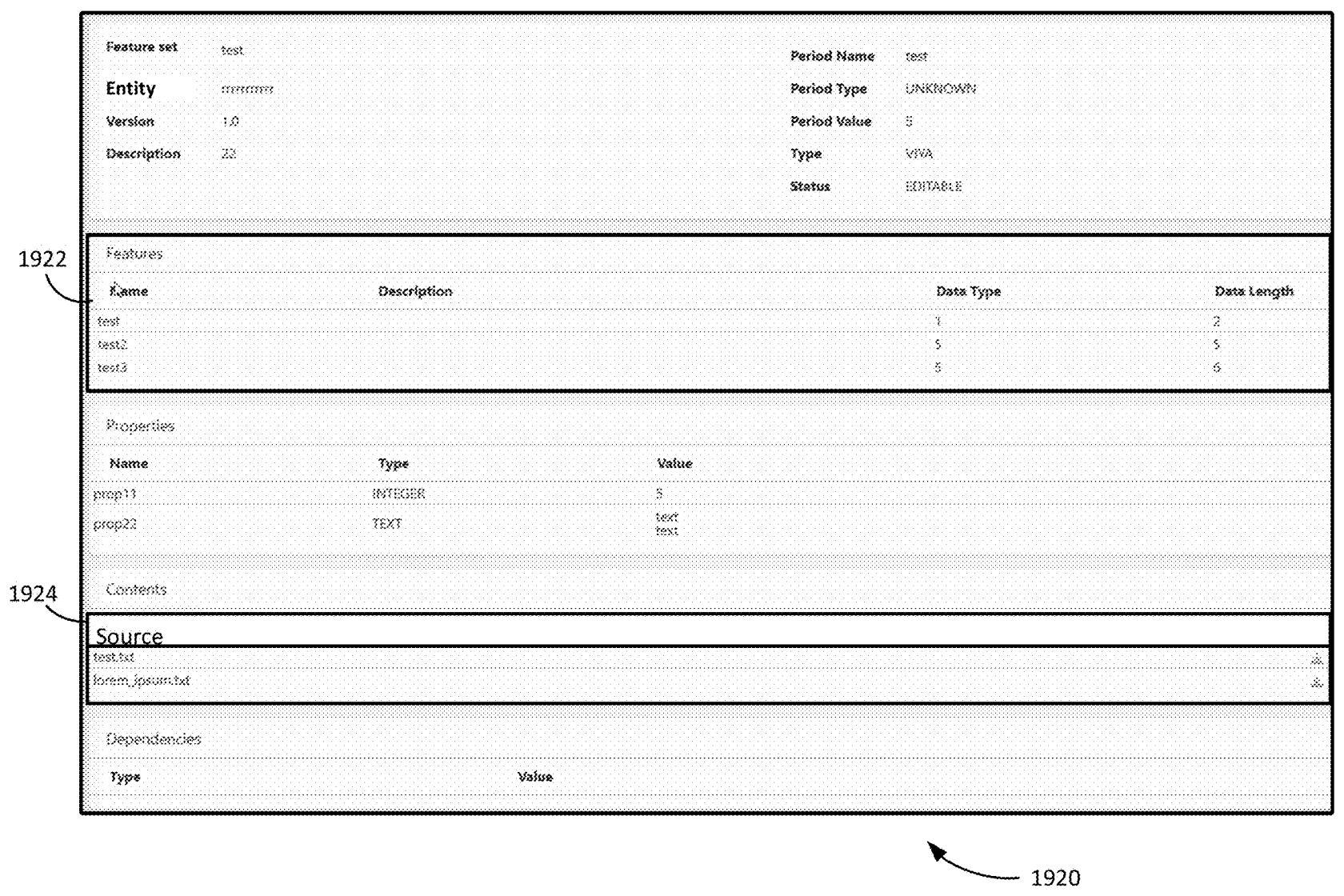

FIG. 19B shows a portion 1920 of graphical user interface. The portion 1920 pertains to an example feature set stored in a feature storage associated with a different entity than the entity in FIG. 19A. The feature set includes multiple features identified in a feature portion 1922. The feature set has a source portion 1924 for files (e.g., with one or more feature set definitions). These definitions may be executed in series or in parallel to evaluate the feature set features.

In FIG. 19C, a portion 1930 of a graphical user interface is used to execute calculations of an analytical set (e.g., Analytical Set 1750 of FIG. 17). The type 1932 shows a type of calculation. The analytical set can be derived from features of a feature set (e.g., the feature set shown in portion 1920 of FIG. 19). For instance, the data collection period 1934 shows a period of time for calculating the data and properties 1936 specify custom properties (e.g., a custom property of type integer) used as parameters for a feature set definition.

A computing system can generate data using a feature definition indicating computer instructions for generating associated data that is associated with the feature set based on user selections (e.g., the user selections shown in FIG. 19C). For example, the user has defined metadata for a feature set type 1932 indicating a data type of calculation.

In FIG. 19D, portion 1940 of a graphical user interface is used to publish a new feature set. The feature set can be new feature set for storage in the feature storage, it can be a preconfigured feature set, or one of multiple preconfigured feature sets. In this case, the feature set is being added to the preconfigured feature set shown in portion 1920 of FIG. 19B. This preconfigured feature set could itself be stored in a feature storage with other preconfigured feature sets. In this example, batch features are scheduled for execution once an hour. Alternatively, a different periodicity could be used such as (once a month or once a day, etc.) or a streaming diagram (engine) could be used to evaluate feature set data in real time on production data.

The user can use the publish control 1942 to publish using a graphical user interface the new feature to the feature storage (e.g., as part of a feature set). When a feature or feature set is published in the feature storage it can be available to other computing systems not associated with the computing system generating the requested data. For instance, a scientist performing a test simulation in one lab can publish feature sets for a computer model that can be used by a scientist in another lab performing a different test simulation. Accordingly, in one or more embodiments, the computing system can receive a pre-configured feature set based on a user configuring a feature set as shown in FIGS. 19C and 19D.

Figure 20A:
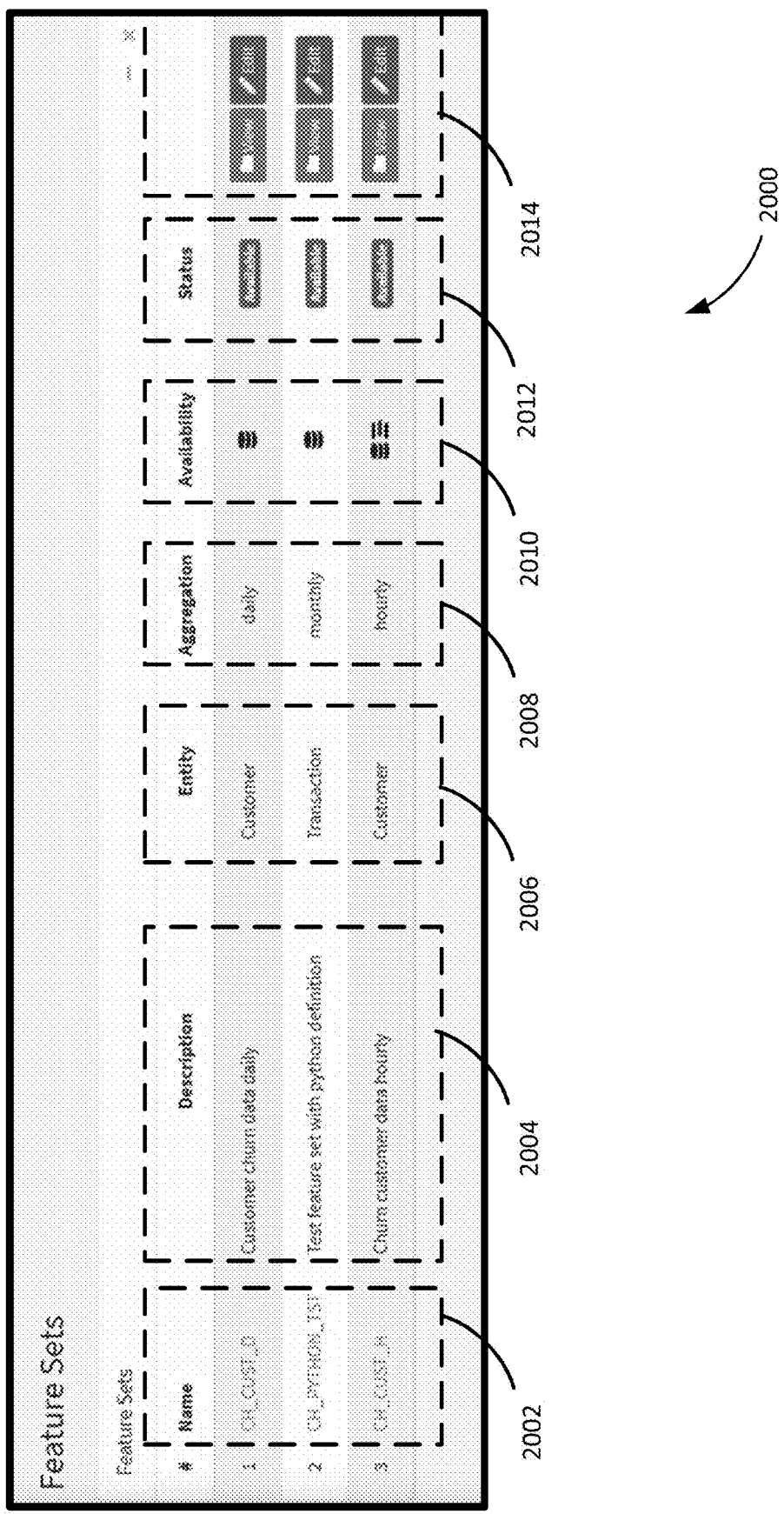

FIGS. 20A-20E illustrate example graphical user interfaces for generating a feature set based on an analytical data set (based on multiple features). FIG. 20A shows an example portion 2000 of a graphical user interface displaying multiple feature sets. Each feature set comprises one or more features. A name column 2002 provides an identifier for each feature set and a description column 2004 provides a user-interpretable description. Other information can be associated with a feature (e.g., entity column 2006 can be used to associate an entity like customer or transaction with a feature set). The graphical user interface can display in proximity to the individual feature sets, one or more cumulative representations pertaining to a characteristic of all the features of a given feature set. In this example, a cumulative representation includes periodicity of aggregation of data for all of the features of the given feature set in the aggregation column 2008. For instance, each of these feature sets are aggregated daily, hourly or monthly as indicated in the aggregation data column. In this example, cumulative representation includes one or more sources for receiving the data for all of the features of the given feature set. For instance, availability column 2010 has icons indicating whether a feature set is deployed in batch or real-time for receiving the data (e.g., a database icon can indicate the feature set is deployed and evaluated in batch on a schedule, and line icons indicate that features are evaluated on real-time data on production streams). A status icon in the status column 2012 can show whether the feature set is currently available. Controls 2014 can be used to further view information regarding a given feature set or edit the feature set (e.g., to change displayed information).

A given feature set can define an input variable extracted by feature engineering for developing an analytical model. For instance, a first feature in the feature set can relate to an input variable for customer churn, and data for that input variable is received daily). A computing system can receive a pre-configured feature set by receiving a user selection from multiple preconfigured feature sets (e.g., one shown in portion 2000 of FIG. 20A). For instance, a user may wish to request data associated with the input variable customer churn data.

In one or more embodiments, the computing system can receive a pre-configured feature set by receiving a user indication of a user-interpretable description or other identifying information for the pre-configured feature set (e.g., the user can select a feature set based on a user description defined in description column 2004).

Figure 20B:
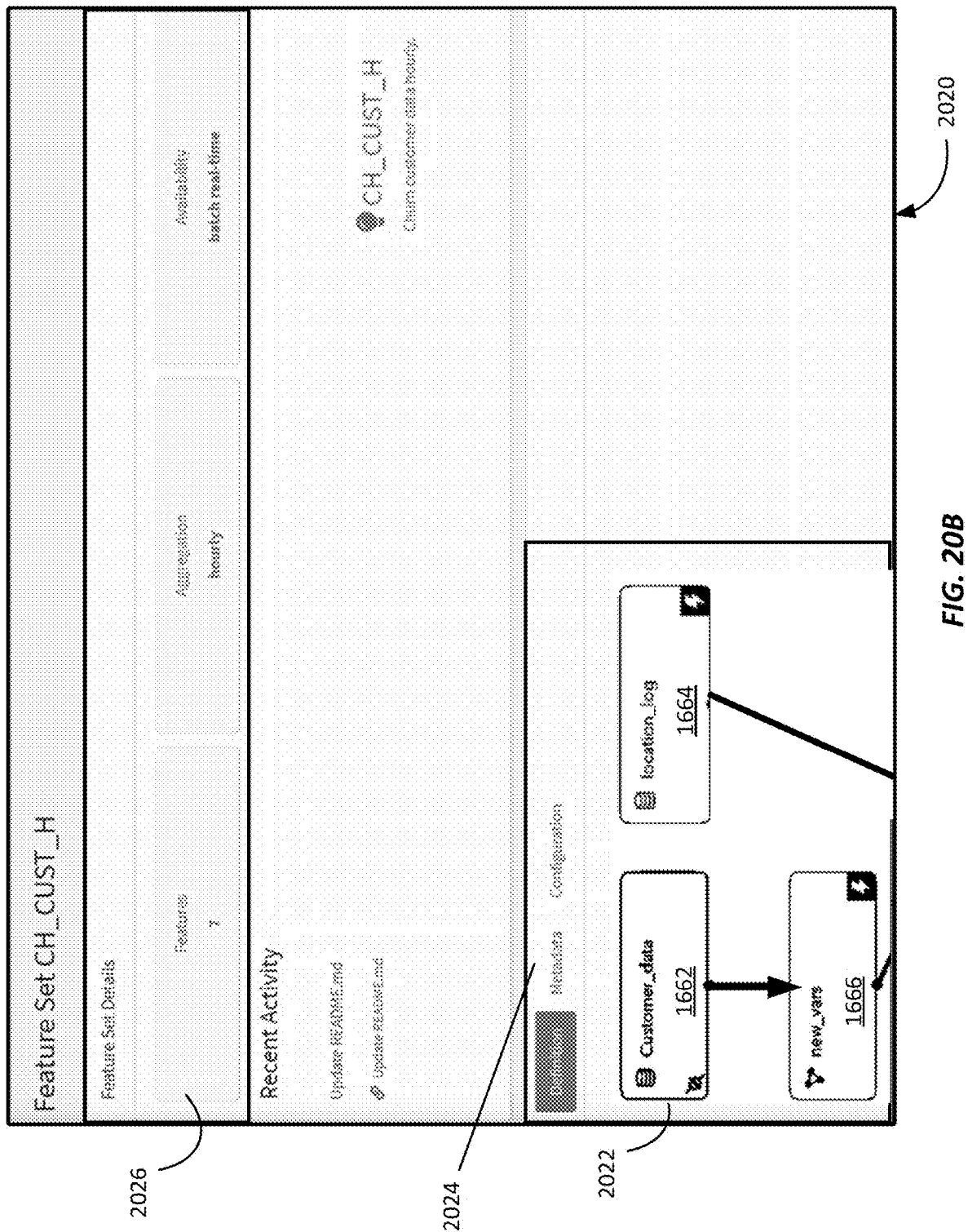

FIG. 20B shows a portion 2020 of a graphical user interface displaying information associated with a selected feature set. In this example, feature set details area 2026 displays information indicating that that there are seven features in the feature set and data for the features is aggregated hourly with data available in batch or real-time delivery. For data that is not available, a definition area 2022 displays a representation of computer instructions for generating data associated with a feature set. Other components of the definition in the definition area 2022 are shown in FIG. 16C. A computing system can receive a pre-configured feature set by receiving a feature definition indicating computer instructions for generating associated data that is associated with the pre-configured feature set. The feature set can also be associated with metadata accessible by the metadata tab 2024. FIG. 20C shows a portion 2030 of a graphical user interface of example metadata associated with the feature set in FIG. 20B. For example, the metadata indicates a data type 2034 for different data associated with the feature set. As in FIG. 20C, a given feature set can have multiple features (e.g., the features identified in the name column 2032) defining input variable with different available data (e.g., for developing the analytical model). The data can be of different types. For example, the different types could include, for example, one or more of integer, character, text, and decimal types. Data type column 2034 shows features associated with this feature set having character, integer, and decimal types.

In one or more embodiments, a computing system can generate data associated with one or more feature sets (e.g., according to a feature definition and user-defined metadata such as a data type, aggregation granularity, and other custom parameters like customer group). FIG. 20D shows an example of creating an analytical set for generating associated data based on multiple features (e.g., from multiple feature sets). Here the portion 2040 of a graphical user interface displays indications of multiple features managed by a feature storage manager (e.g., feature storage manager 1314 of FIG. 13). The features are identified in feature name column 2042. Information regarding the features can be provided for a user for selecting a particular feature (e.g., for preparing an analytical feature stage). For instance, graphical user interface portion 2040 provides a description column 2044 for the feature. The portion 2040 also other information associated with the feature name 2042, such as entity column 2046 and a feature set 2048.

In one or more embodiments, a computing system could receive a single feature, to generate a single feature analytical set. Alternatively, a computing system receives a selection of at least two features. For instance, here in the selection column 2050 the user has selected the displayed features and selected the generate control 2052 to generate an analytical set. The computing system can then receive a request for data by receiving a request for data pertaining to the selected features (e.g., to control development of the analytical model based on the selected features).

Figure 20E:

FIG. 20E shows a portion 2060 of a graphical user interface for requesting data pertaining to the selected features selected in FIG. 20D as part of generating an analytical set. For example, in FIG. 20E, the user is providing a date range 2062 for requested data. The preconfigured feature set may define batch data for an input variable over a predefined time period. The user may request a data set for a requested time period for the batch data that is different than the predefined time period in metadata definitions associated with the feature set. If the requested range in FIG. 20E is different than what is available, the computing system can generate the requested data set over the requested time period (e.g., using definitions supplied by a feature storage manager based on the batch data the computing system currently has available).

Figure 21A:
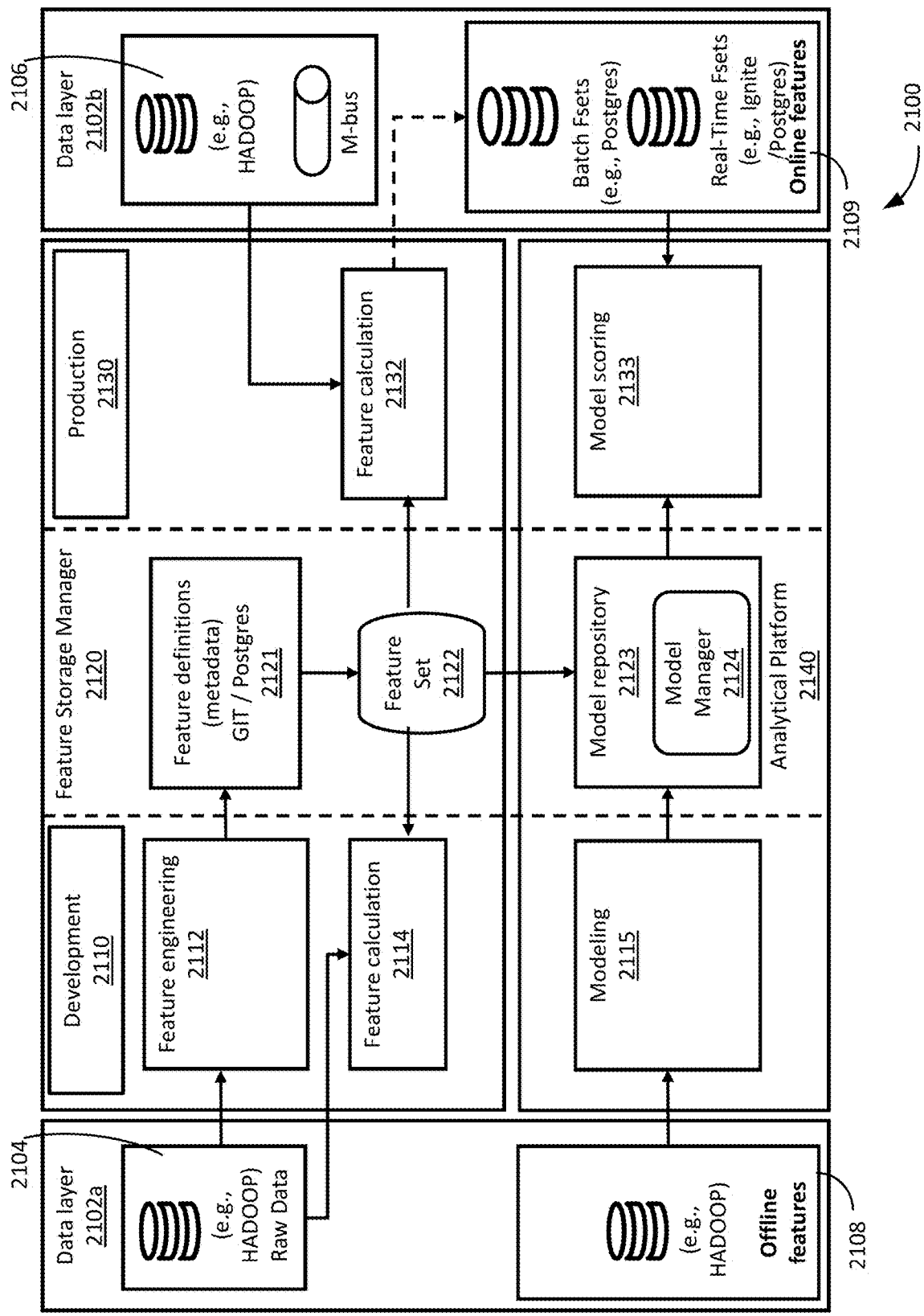
FIG. 21A-21D illustrate an example computer architecture for developing and executing an analytical model according to at least one embodiment of the present technology.

FIG. 21A-21D illustrate an example computer architecture for developing and executing an analytical model according to some example embodiments. FIG. 21A shows an architecture for developing and deploying an analytical model developed according to techniques herein.

FIG. 21A shows a system 2100 that has a data layer 2102 for storing data, a feature storage manager 2120 according to embodiments herein and an analytical platform 2140. The feature storage manager 2120 and analytical platform 2140 perform operations for development of a model in a development phase 2110 and for production of a computing model in a production phase 2130. For instance, the feature storage manager 2120 can develop a model by feature engineering operations 2112 on stored raw data 2104 such as captured images from a video or camera or sensors such as temperature measurements. Feature engineering operations 2112 can be used to select, manipulate and transform raw data into features that can be used for developing a model (e.g., using platforms such as CAS®, event stream processing or ESP, Python®, and SQL®). For instance, if the raw data contains video images, feature engineering can be used, for example, to transform images, detect objects, track objects, and annotate objects measured in the images. As another example, if the sensor is measuring temperature and humidity across different environments, feature engineering may be used to transform those measurements into a combined metric and or adjust for different environment thresholds. Within the feature storage manager 2120, feature definitions (e.g., in metadata) can be recorded (e.g., using a GIT or Postgres database). One or more features can be combined in the feature storage manager 2120 into a feature set operation 2122. Feature sets and raw data 2104 can be used to calculate data for new or existing features in a feature calculation operation 2114. Similarly feature calculation operations 2132 can be utilized in a production phase 2130 using stored data 2106 and feature sets (e.g., for validating, monitoring, or updating a model). Calculations performed can be done on platforms such as CAS®, ESP, Python® and SQL®.

The analytical platform 2140 can be used for developing a model in a modeling operation 2115 during a development phase 2110. For instance, SAS® (e.g., Visual Data Mining and Machine Learning, VDDML, and SAS® Studio) and Python® platforms can be used for developing a model. A model can be developed based on stored data 2108 (e.g., data generated according to embodiments herein). Data 2108 can be associated with features that are accessible even offline. A developed model can be stored in a model repository 2123 that is managed by a model manager 2124 (e.g., one selecting a champion model from challenger model options). Model scoring operations 2133 can be used in a production phase 2130 for evaluating and monitoring developed models. For instance, model scoring can be performed by platforms such as CAS®, ESP, SAS® In-Database processing (or in-db) and SAS® Intelligent Decisioning (SID).

The data layer 2102 can be used to provide input data 2109 after developing the analytical model for executing the machine learning model using the input data (e.g., for model scoring). For instance, in this example, batch features and real-time or online features can be used for scoring the model. This input data 2109 can be associated with online features to provide data remotely accessible such as over the Internet.

Figure 21B:
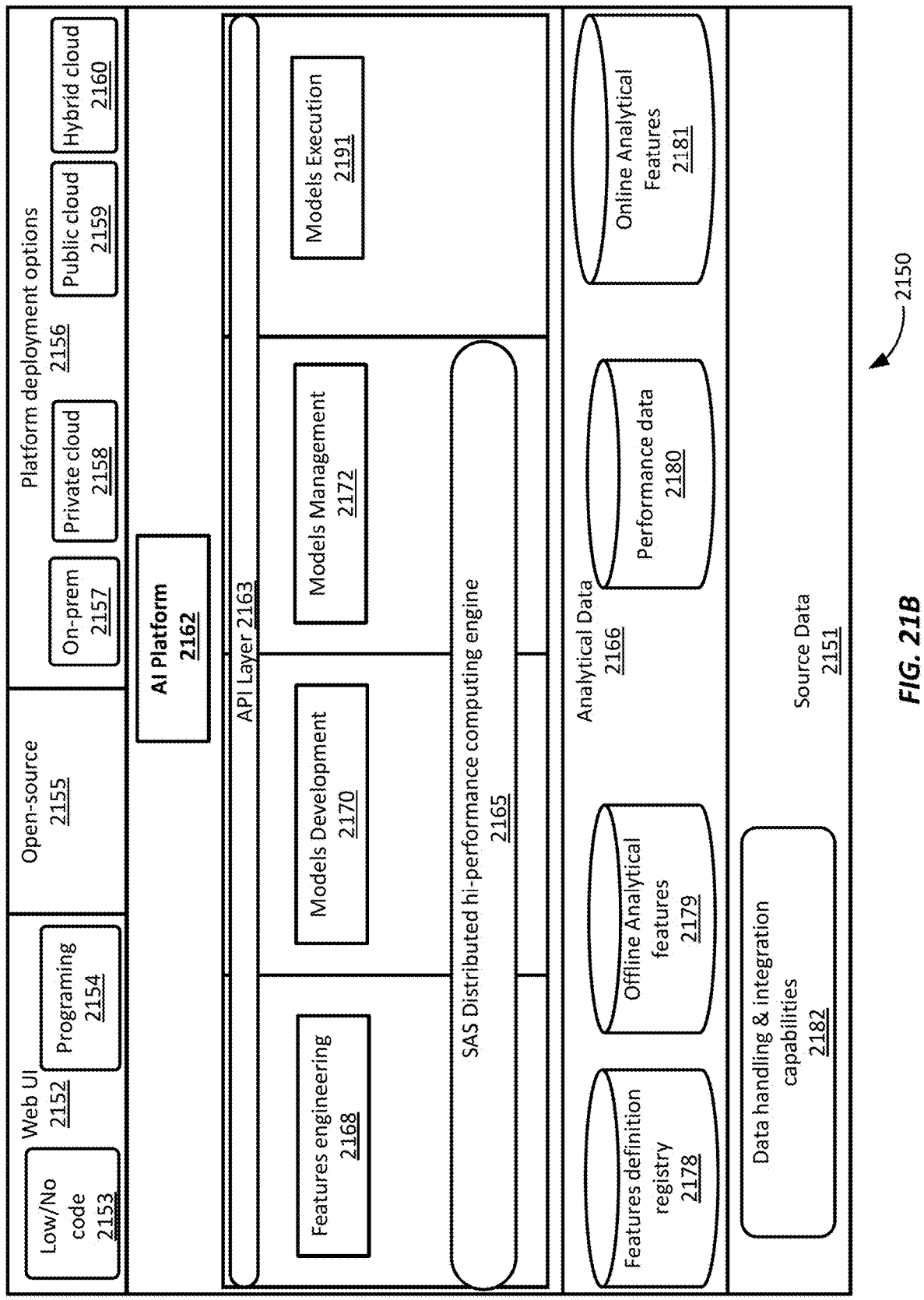

FIG. 21B shows components of a system for supporting the architecture of FIG. 21A. The Web user interface 2152 and open-source 2155 can be used to import and register features and/or data via an application programing interface. For instance, a web user interface 2142 can be used for programing 2154 or low/no coding operations 2153 for developing a model. Once features, data, or models are generated, platform deployment options 2156 can be used for sharing generated aspects (e.g., using on-prem networks 2157, private cloud networks 2158, public cloud networks 2159, and hybrid cloud networks 2160.

These tools can interface with an Artificial Intelligence (AI) Platform 2162. For instance, the AI Platform 2162 can communicate with an application programming interface (API) Layer 2163 for performing various model, feature, and data development tasks (e.g., feature engineering operations 2168, models development operations 2170, models management operations 2172, and models execution operations 2191 described in more detail with respect to FIG. 21C) or other AI tasks (described in more detail with respect to FIG. 21D). For instance, the API Layer 2163 can be used for model registration and model deployment and automation. In one or more embodiments, a SAS® distributed hi-performance computing engine 2165 can be used for performing these operations and for interfacing with an analytical data platform such as the Analytical Data Platform 2166. The Analytical Data Platform 2166 can be used, for example, for features deployment and automation. For instance, the Analytical Data Platform 2166 can be used to support a features definition registry 2178, offline analytical features 2179 (e.g., for developing a model), performance data 2180, and online analytical features 2181 (e.g., for production of a model). A source data layer 2151 can be used for providing data such as data handling and integration capability operations 2182.

Figure 21C:
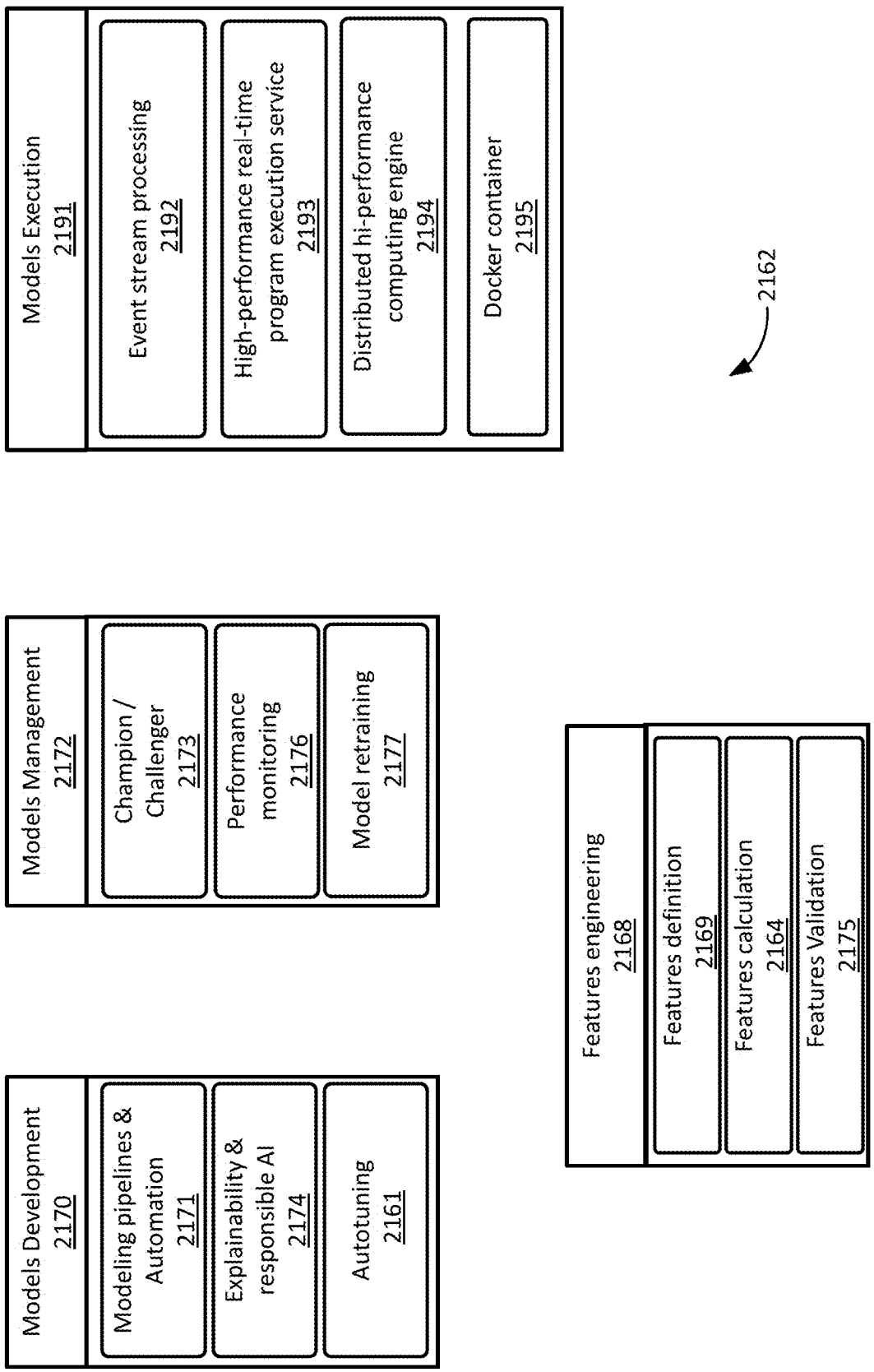

FIG. 21C shows example operations performed by the application layer 2163 in more detail. For example, models development operations 2170 can include operations such as modeling pipelines and automation 2171, explainability and responsible artificial intelligence 2174, and autotuning 2161. Models management operations 2172 can include operations such as champion/challenger selection operations 2173 where the computing system must pick the best one or more models to serve as a model or combined model for a scenario from other challenger models. Additionally, or alternatively, models management operations 2172 can include operations for performance monitoring 2176 for ensuring a model is performing as expected. If a model is not performing as expected another model may need to be selected (e.g., a challenger model). Additionally, or alternatively, models management operations 2172 can include model retraining 2177 (e.g., to keep models up to date with current input data).

Models execution operations 2191 can include operations such as event stream processing 2192, high-performance real-time program execution service 2193, distributed hi-performance computing engine 2194 and docket container 2195. Features engineering operations 2168 can be used for generating features definition 2169, features calculation 2164, and features validation 2175 as described in more detail herein.

Figure 21D:
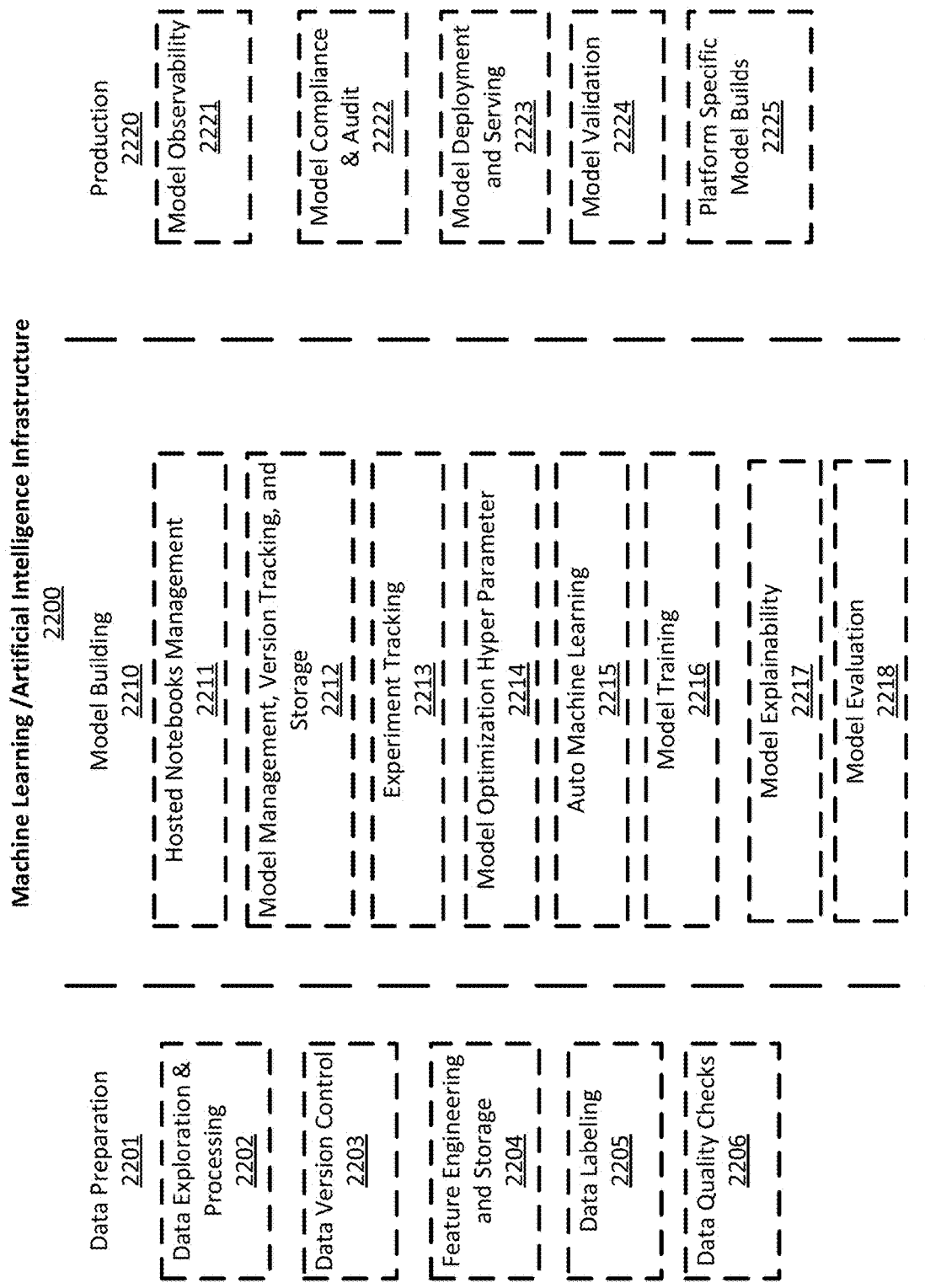

FIG. 21D shows example, machine learning/artificial intelligence infrastructure 2200 (e.g., provided by AI platform 2162). For instance, the AI platform 2162 can be used for data preparation operations 2201. Data preparation operations 2201 can include one or more of data exploration and processing 2202, data version control 2203, feature engineering and storage 2204, data labeling 2205, and data quality checks 2206.

Additionally, or alternatively, the AI platform 2162 can be used for model building operations 2210. Model building operations 2210 can include hosted notebooks management 2211; model management, version tracking, and storage 2212; experiment tracking 2213; model optimization hyper parameter 2214; auto machine learning 2215; model training 2216; model explainability 2217; and model evaluation 2218.

Additionally, or alternatively, the AI platform 2162 can be used for production operations 2220. Production operations 2220 can include model observability 2221, model compliance and audit 2222, model deployment and serving 2223, model validation 2224, and platform specific model builds 2225.

One of ordinary skill in the art will appreciate other computer architectures then those described with respect to FIGS. 21A-21D that could be used to support embodiments described herein.

What is claimed is:

1. A computer-program product tangibly embodied in a non-transitory machine-readable storage medium, the computer-program product including system instructions operable to cause a computing system to:
    generate a graphical user interface comprising user-interpretable descriptions of multiple preconfigured feature sets;
    obtain, at the computing system, a first preconfigured feature set comprising one or more feature definitions by receiving user input at the graphical user interface, wherein the first preconfigured feature set defines:
        a first feature definition defining an input variable extracted by feature engineering for developing an analytical model; and
        first computer instructions for locating first data, wherein the first data is associated with the input variable for developing the analytical model, and wherein the first data is available for retrieval because it is stored, or set-up to arrive, in feature storage according to the first preconfigured feature set;
    receive, at the computing system, a request for a data set for the input variable for developing the analytical model;
    determine, by the computing system, that the data set is unavailable for retrieval according to the first preconfigured feature set;
    responsive to determining that the data set is unavailable for retrieval according to the first preconfigured feature set, generate, by the computing system, the data set by:
        retrieving historical data for the first preconfigured feature set;
        retrieving a data definition associated with the historical data; and
        generating the data set based on the historical data and the data definition; and
    control, by the computing system, development of the analytical model based on the data set, wherein to control the development of the analytical model, the system instructions are operable to cause the computing system to generate the analytical model based on the data set.

2. The computer-program product of claim 1, wherein the system instructions are operable to cause the computing system to generate an availability status indicating whether the requested data set is available for retrieval according to the first preconfigured feature set by:
    checking, by the computing system, metadata associated with the first preconfigured feature set to determine whether the requested data set is available for retrieval according to the first preconfigured feature set; and
    generating the availability status indicating that the requested data set is not available for retrieval according to the metadata because there is no metadata indicating the requested data set stored, or set-up to arrive, in the feature storage.

3. The computer-program product of claim 1, wherein the system instructions are operable to cause the computing system to:
    associate the first preconfigured feature set and a second preconfigured feature set with an entity representing a real-world object, event, person, or business;
    generate the data set by generating an analytical data set for the entity comprising data pertaining to each of the first preconfigured feature set and the second preconfigured feature set; and
    control development of the analytical model based on the analytical data set.

4. The computer-program product of claim 1,
    wherein the first preconfigured feature set is stored in a feature storage comprising a plurality of preconfigured feature sets; and
    wherein the system instructions are operable to cause the computing system to:
        configure a new feature;
        associate, using the graphical user interface, the requested data set with the new feature;
        associate, using the graphical user interface, the new feature with one of the plurality of preconfigured feature sets or a new feature set for storage in the feature storage; and
        publish, using the graphical user interface, the new feature to the feature storage so that it is available to other computing systems not associated with the computing system generating the data set.

5. The computer-program product of claim 1, wherein the system instructions are operable to cause the computing system to:
    display, in the graphical user interface, indications of multiple features managed by a feature storage manager;

receive, using the graphical user interface, a selection of at least two of the multiple features;
receive the request for the data set by receiving a request for a data set pertaining to the at least two of the multiple features; and
control development of the analytical model based on the at least two of the multiple features.

6. The computer-program product of claim 1, wherein the system instructions are operable to cause the computing system to
obtain the first preconfigured feature set by receiving a user selection from the multiple preconfigured feature sets.

7. The computer-program product of claim 1, wherein the system instructions are operable to cause the computing system to obtain the first preconfigured feature set by receiving a user indication of a key associating multiple ones of the multiple preconfigured feature sets.

8. The computer-program product of claim 1, wherein the system instructions are operable to cause the computing system to obtain the first preconfigured feature set by:
receiving a user indication of a user-interpretable description for the first preconfigured feature set;
receiving the first feature definition further indicating computer instructions for generating associated data that is associated with the first preconfigured feature set;
receiving user-defined metadata indicating a data type for generating the associated data; and
generating the associated data according to the first feature definition and user-defined metadata.

9. The computer-program product of claim 1, wherein the system instructions are operable to cause the computing system to generate an availability status indicating whether the requested data set is available for retrieval according to the first preconfigured feature set, and:
wherein the first data is specific to a particular time period;
wherein the data set is requested in a request for developing the analytical model trained on a requested time period that does not include the particular time period;
wherein the availability status indicates the requested data set is not available for retrieval according to the first preconfigured feature set because there are no metadata associated with the first preconfigured feature set for locating the requested data set stored, or set-up to arrive, in the feature storage for the requested time period; and
wherein the system instructions are operable to cause the computing system to generate the data set by generating the data set for the particular time period.

10. The computer-program product of claim 1,
wherein the first preconfigured feature set defines first data that is batch data for the input variable over a predefined time period;
wherein the request for the data set requests a requested time period for the batch data that is different than the predefined time period; and
wherein the system instructions are operable to cause the computing system to generate the data set over the requested time period based on the batch data.

11. The computer-program product of claim 1,
wherein the first data defined in the first preconfigured feature set is an original real-time data measurement for the input variable;
wherein the data set requests a different real-time data measurement; and
wherein the system instructions are operable to cause the computing system to generate the data set based on the original real-time data measurement.

12. The computer-program product of claim 1,
wherein the first preconfigured feature set comprises multiple features defining the first data and second data to be available for the input variable for developing the analytical model that is a machine learning model;
wherein the first data comprises data accessible online; and
wherein the second data comprises data accessible offline.

13. The computer-program product of claim 1,
wherein the first preconfigured feature set comprises multiple features defining the first data and second data to be available for the input variable for developing a machine learning model;
wherein the first data and the second data are of different types; and
wherein the different types comprise one or more of an integer type, a character type, a text type, and a decimal type.

14. The computer-program product of claim 1,
wherein the system instructions are operable to cause the computing system to obtain the first preconfigured feature set from a source remote from the computing system; and
wherein the first preconfigured feature set indicates computer instructions for retrieving the historical data.

15. The computer-program product of claim 1, wherein the system instructions are operable to cause the computing system to control the development of the analytical model based on the data set by generating data tables of the data set for one or more of:
training the analytical model; and
evaluating the analytical model.

16. The computer-program product of claim 1, wherein the system instructions are operable to cause the computing system to:
display, in the graphical user interface, multiple feature sets, wherein each individual feature set comprises one or more features; and
display, in the graphical user interface, in proximity to the individual feature sets, one or more cumulative representations pertaining to a characteristic of all the features of a given feature set, wherein the one or more cumulative representations comprise one or more of:
one or more periodicities of aggregation of data for the features of the given feature set; and
one or more sources for receiving the data for the features of the given feature set.

17. The computer-program product of claim 1, wherein the system instructions are operable to cause the computing system to obtain the first preconfigured feature set by:
receiving an indication that a first feature is not in a feature storage;
updating metadata and definitions to generate the first feature; and
storing the first feature in the feature storage.

18. A computer-implemented method comprising:
generating a graphical user interface comprising user-interpretable descriptions of multiple preconfigured feature sets;
obtaining, at a computing system, a first preconfigured feature set comprising one or more feature definitions by receiving user input at the graphical user interface, wherein the first preconfigured feature set defines:

a first feature definition defining an input variable extracted by feature engineering for developing an analytical model; and first computer instructions for locating first data, wherein the first data is associated with the input variable for developing the analytical model, and wherein the first data is available for retrieval because it is stored, or set-up to arrive, in feature storage according to the first preconfigured feature set;

receiving, at the computing system, a request for a data set for the input variable for developing the analytical model;

determining, at the computing system, that the data set is unavailable for retrieval according to the first preconfigured feature set;

responsive to determining that the data set is unavailable for retrieval according to the first preconfigured feature set, generating, by the computing system, the data set by:

retrieving historical data for the first preconfigured feature set;

retrieving a data definition associated with the historical data; and generating the data set based on the historical data and the data definition; and controlling, by the computing system, development of the analytical model based on the data set, wherein controlling the development of the analytical model comprises the computing system generating the analytical model based on the data set.

19. The computer-implemented method of claim 18, wherein obtaining the first preconfigured feature set comprises:

receiving an indication that a first feature is not in a feature storage;

updating metadata and definitions to generate the first feature; and storing the first feature in the feature storage.

20. The computer-implemented method of claim 18, further comprising generating, by the computing system, an availability status indicating whether the data set is available for retrieval according to the first preconfigured feature set, wherein generating the availability status comprises:

checking, by the computing system, metadata associated with the first preconfigured feature set to determine whether the data set is available for retrieval according to the first preconfigured feature set; and generating the availability status indicating that the requested data set is not available for retrieval according to the metadata because there is no metadata indicating the requested data set stored, or set-up to arrive, in the feature storage.

21. The computer-implemented method of claim 18, further comprising associating the first preconfigured feature set and a second preconfigured feature set with an entity representing a real-world object, event, person, or business, and:

wherein the generating the data set comprises generating an analytical data set for the entity comprising data pertaining to each of the first preconfigured feature set and the second preconfigured feature set; and wherein the controlling the development of the analytical model comprises controlling the development of the analytical model based on the analytical data set.

22. The computer-implemented method of claim 18, wherein the first preconfigured feature set is stored in a feature storage comprising a plurality of preconfigured feature sets, and wherein the computer-implemented method further comprises:

associating, using the graphical user interface, the data set with a new feature;

associating, using the graphical user interface, the new feature with one of the plurality of preconfigured feature sets or a new feature set for storage in the feature storage; and publishing, using the graphical user interface, the new feature to the feature storage so that it is available to other computing systems not associated with the computing system generating the requested data.

23. The computer-implemented method of claim 18, wherein the computer-implemented method further comprises:

displaying, in the graphical user interface, indications of multiple features managed by a feature storage manager;

receiving, using the graphical user interface, a selection of at least two of the multiple features;

wherein the receiving a request for the data set comprises receiving a request for a data set pertaining to the at least two of the multiple features; and wherein the controlling the development of the analytical model comprises controlling the development of the analytical model based on the at least two of the multiple features.

24. The computer-implemented method of claim 18, wherein the obtaining the first preconfigured feature set comprises receiving a user selection from the multiple preconfigured feature sets.

25. The computer-implemented method of claim 18, wherein the obtaining the first preconfigured feature set comprises receiving a user indication of a key associating multiple ones of the multiple preconfigured feature sets.

26. The computer-implemented method of claim 18, wherein the obtaining the first preconfigured feature set comprises:

receiving a user indication of a user-interpretable description for the first preconfigured feature set;

receiving the first feature definition further indicating computer instructions for generating associated data that is associated with the first preconfigured feature set;

receiving user-defined metadata indicating a data type for generating the associated data; and generating the associated data according to the first feature definition and user-defined metadata.

27. The computer-implemented method of claim 18, further comprising generating an availability status indicating whether the request data set is available for retrieval according to the first preconfigured feature set, and:

wherein the first data is specific to a particular time period;

wherein the data set is requested in a request for developing the analytical model trained on a requested time period that does not include the particular time period;

wherein the availability status indicates the data set is not available for retrieval according to the first preconfigured feature set because there are no metadata associated with the first preconfigured feature set for locating the requested data set stored, or set-up to arrive, in the feature storage for the requested time period; and wherein the generating the data set comprises generating the data set for the particular time period.

28. The computer-implemented method of claim 18, wherein the first preconfigured feature set defines first data that is batch data for the input variable over a predefined time period;

wherein the data set requests a requested time period for the batch data that is different than the predefined time period; and wherein the generating the data set comprises generating the data set over the requested time period based on the batch data.

29. The computer-implemented method of claim 18, wherein the first preconfigured feature set defines first data that is an original real-time data measurement for the input variable;

wherein the data set requests a different real-time data measurement; and wherein the generating the data set comprises generating the data set based on an original real-time data measurement.

30. A computing device comprising processor and memory, the memory containing instructions executable by the processor wherein the computing device is configured to:

generate a graphical user interface comprising user-interpretable descriptions of multiple preconfigured feature sets;

obtain, at the computing system, a first preconfigured feature set comprising one or more feature definitions by receiving user input at the graphical user interface, wherein the first preconfigured feature set defines:

a first feature definition defining an input variable extracted by feature engineering for developing an analytical model; and first computer instructions for locating first data, wherein the first data is associated with the input variable for developing the analytical model, and wherein the first data is available for retrieval because it is stored, or set-up to arrive, in feature storage according to the first preconfigured feature set;

receive, at the computing system, a request for a data set for the input variable for developing the analytical model;

determine, by the computing system, that the data set is unavailable for retrieval according to the first preconfigured feature set;

responsive to determining that the data set is unavailable for retrieval according to the first preconfigured feature set, generate, by the computing system, the data set by:

retrieving historical data for the first preconfigured feature set;

retrieving a data definition associated with the historical data; and generating the data set based on the historical data and the data definition; and control, by the computing system, development of the analytical model based on the data set, wherein to control the development of the analytical model, the computing system is caused to generate the analytical model based on the data set.

* * * * *